US012058015B2

(12) United States Patent
Erickson et al.

(10) Patent No.: US 12,058,015 B2
(45) Date of Patent: Aug. 6, 2024

(54) SYSTEMS AND METHODS FOR AN INTERACTIVE NETWORK ANALYSIS PLATFORM

(71) Applicant: Forward Networks, Inc., Palo Alto, CA (US)

(72) Inventors: David Erickson, Sunnyvale, CA (US); Brandon Heller, Menlo Park, CA (US); Nikhil Handigol, Milpitas, CA (US); Peyman Kazemian, Redwood City, CA (US); Sivasankar Radhakrishnan, Santa Clara, CA (US); Yasser Ganjisaffar, Sunnyvale, CA (US); Braeden Partridge, Los Altos, CA (US); Jared Jacobs, Palo Alto, CA (US); Matthias Schroeder, Berlin (DE); Behram Mistree, Palo Alto, CA (US); Rachit Biyani, Santa Clara, CA (US); Andreas Voellmy, Mountain View, CA (US); Natale Ruello, San Jose, CA (US); Chiara Regale, Santa Clara, CA (US); Pete Crocker, Falmouth (GB); William S. Whyte, San Jose, CA (US); Yuefeng Liu, Cupertino, CA (US); Jasdeep Hundal, Fremont, CA (US); Qi Li, Mountain View, CA (US)

(73) Assignee: Forward Networks, Inc., Palo Alto, CA (US)

( * ) Notice: Subject to any disclaimer, the term of this patent is extended or adjusted under 35 U.S.C. 154(b) by 0 days.

(21) Appl. No.: 15/789,888

(22) Filed: Oct. 20, 2017

(65) Prior Publication Data

US 2018/0115469 A1 Apr. 26, 2018

Related U.S. Application Data

(60) Provisional application No. 62/411,365, filed on Oct. 21, 2016.

(51) Int. Cl.
*H04L 43/026* (2022.01)
*H04L 41/0853* (2022.01)
(Continued)

(52) U.S. Cl.
CPC ........ *H04L 43/026* (2013.01); *H04L 41/0853* (2013.01); *H04L 41/12* (2013.01);
(Continued)

(58) Field of Classification Search
CPC ... H04L 43/026; H04L 41/12; H04L 41/0853; H04L 43/062; H04L 43/045; H04L 43/50;
(Continued)

(56) References Cited

U.S. PATENT DOCUMENTS 6,035,838 A * 3/2000 Tozzi ..................... F02P 9/007
  123/654
7,376,550 B1 * 5/2008 Bokaemper ......... G06F 11/3414
  703/21

(Continued)

FOREIGN PATENT DOCUMENTS

AU  2017345769  2/2021
CA  2 200 412  12/1997
(Continued)

OTHER PUBLICATIONS

International Search Report and Written Opinion issued in Application No. PCT/US17/57750 dated Jan. 8, 2018.
(Continued)

*Primary Examiner* — Michael Won
(74) *Attorney, Agent, or Firm* — Hogan Lovells US LLP

(57) ABSTRACT

Embodiments of the present invention provide improved methods, techniques, and systems to compute relevant and useful information that may be presented to users in an understandable, intuitive, and actionable platform. The interactive platform includes a format and visualization that
(Continued)

is capable of presenting data for a wide range of protocols and topologies at various functional layers of the network. The interactive platform provides selectable categories of filters which update the network data and views displayed to the users to aid in the analysis and investigation of potential root causes of problems, rather than merely presenting examples of symptoms. The interactive platform includes a method and visualization that is capable of presenting differences in network behavior at various functional layers of the network.

20 Claims, 16 Drawing Sheets

(51) Int. Cl.
| | | |
|---|---|---|
| H04L 41/12 | (2022.01) | |
| H04L 43/045 | (2022.01) | |
| H04L 43/062 | (2022.01) | |
| H04L 41/22 | (2022.01) | |
| H04L 43/00 | (2022.01) | |
| H04L 43/028 | (2022.01) | |
| H04L 43/50 | (2022.01) | |

(52) U.S. Cl.
CPC .......... *H04L 43/045* (2013.01); *H04L 43/062* (2013.01); *H04L 41/22* (2013.01); *H04L 43/028* (2013.01); *H04L 43/14* (2013.01); *H04L 43/50* (2013.01); *Y02D 30/50* (2020.08)

(58) Field of Classification Search
CPC ....... H04L 41/22; H04L 43/028; H04L 43/14; H04L 12/1886; H04L 2012/5684; H04L 29/06897; H04L 47/125; H04L 45/304; H04L 45/3065; H04L 47/24; H04L 47/00; H04L 47/22; H04L 47/80; H04L 49/206; H04L 47/2483; H04L 45/38; H04L 47/10; H04L 47/18; Y02D 50/30
USPC ......................................... 709/202, 203, 223
See application file for complete search history.

(56) References Cited

U.S. PATENT DOCUMENTS

| | | | | |
|---|---|---|---|---|
| 7,721,211 | B1* | 5/2010 | Yehuda | H04L 41/22 |
| | | | | 715/734 |
| 7,742,406 | B1* | 6/2010 | Muppala | H04L 41/5022 |
| | | | | 370/230 |
| 7,853,678 | B2* | 12/2010 | Khemani | H04L 61/30 |
| | | | | 709/224 |
| 8,295,198 | B2* | 10/2012 | Newman | H04L 63/1441 |
| | | | | 370/253 |
| 8,386,937 | B1* | 2/2013 | Gao | H04L 41/0853 |
| | | | | 715/736 |
| 8,843,627 | B1 | 9/2014 | Baldi et al. | |
| 8,934,495 | B1* | 1/2015 | Hilton | H04L 43/028 |
| | | | | 370/401 |
| 9,094,288 | B1* | 7/2015 | Nucci | H04L 43/026 |
| 9,338,223 | B2* | 5/2016 | Threefoot | H04L 67/10 |
| 10,298,476 | B2* | 5/2019 | Heinz | H04L 41/5025 |
| 10,320,691 | B1* | 6/2019 | Matthews | H04L 47/31 |
| 10,616,072 | B1* | 4/2020 | Lo | H04L 41/064 |
| 2004/0103211 | A1 | 5/2004 | Jackson | |
| 2005/0071350 | A1* | 3/2005 | Artale | G06Q 10/06 |
| 2006/0168255 | A1* | 7/2006 | Katz | H04L 63/1416 |
| | | | | 709/229 |
| 2007/0014233 | A1 | 1/2007 | Oguro | |
| 2007/0140131 | A1* | 6/2007 | Malloy | H04L 43/026 |
| | | | | 370/241 |
| 2007/0195698 | A1* | 8/2007 | Briscoe | H04L 45/70 |
| | | | | 370/252 |
| 2008/0091301 | A1* | 4/2008 | Brantmark | G05B 19/41825 |
| | | | | 700/245 |
| 2008/0294770 | A1 | 11/2008 | Jackson et al. | |
| 2009/0327903 | A1* | 12/2009 | Smith | H04L 43/50 |
| | | | | 715/737 |
| 2011/0082936 | A1* | 4/2011 | Breslin | H04L 45/00 |
| | | | | 709/226 |
| 2012/0036245 | A1* | 2/2012 | Dare | H04L 41/5041 |
| | | | | 709/223 |
| 2012/0166616 | A1* | 6/2012 | Meehan | G06Q 50/06 |
| | | | | 709/224 |
| 2012/0197965 | A1* | 8/2012 | McCanne | H03M 7/30 |
| | | | | 709/202 |
| 2012/0281535 | A1* | 11/2012 | Day | H04L 65/605 |
| | | | | 370/235 |
| 2013/0073486 | A1* | 3/2013 | Petrick | H04L 41/142 |
| | | | | 706/12 |
| 2013/0111014 | A1* | 5/2013 | Lawrie | H04L 43/12 |
| | | | | 709/224 |
| 2013/0198119 | A1 | 8/2013 | Eberhardt, III et al. | |
| 2013/0246944 | A1* | 9/2013 | Pandiyan | H04L 41/22 |
| | | | | 715/760 |
| 2013/0305357 | A1* | 11/2013 | Ayyagari | H04W 12/06 |
| | | | | 726/22 |
| 2013/0326048 | A1* | 12/2013 | Heidasch | G06N 5/02 |
| | | | | 709/224 |
| 2014/0233421 | A1* | 8/2014 | Matthews | H04L 49/35 |
| | | | | 370/253 |
| 2014/0237595 | A1* | 8/2014 | Sridhara | G06F 21/55 |
| | | | | 726/23 |
| 2014/0279768 | A1* | 9/2014 | Rash | G06N 5/02 |
| | | | | 706/14 |
| 2015/0092778 | A1 | 4/2015 | Jackson | |
| 2015/0120856 | A1* | 4/2015 | Bennett | H04L 41/145 |
| | | | | 709/213 |
| 2015/0143456 | A1* | 5/2015 | Raleigh | H04W 12/08 |
| | | | | 726/1 |
| 2015/0195171 | A1* | 7/2015 | Mermoud | H04L 43/0864 |
| | | | | 370/253 |
| 2015/0256413 | A1* | 9/2015 | Du | H04L 41/12 |
| | | | | 370/216 |
| 2015/0295778 | A1* | 10/2015 | Hsiao | H04L 43/0894 |
| | | | | 715/736 |
| 2016/0021017 | A1* | 1/2016 | Thubert | H04L 47/125 |
| | | | | 370/235 |
| 2016/0036636 | A1* | 2/2016 | Erickson | H04L 41/145 |
| | | | | 370/248 |
| 2016/0057061 | A1* | 2/2016 | Avci | H04L 41/5038 |
| | | | | 370/235 |
| 2016/0065407 | A1 | 3/2016 | Saltsidis | |
| 2016/0072831 | A1* | 3/2016 | Rieke | H04L 43/062 |
| | | | | 726/1 |
| 2016/0080285 | A1* | 3/2016 | Ramachandran | G06F 16/285 |
| | | | | 709/223 |
| 2016/0080502 | A1* | 3/2016 | Yadav | G06F 16/285 |
| | | | | 709/227 |
| 2016/0112277 | A1* | 4/2016 | Nagarajan | H04J 14/02 |
| | | | | 715/736 |
| 2016/0205002 | A1* | 7/2016 | Rieke | H04L 43/04 |
| | | | | 709/224 |
| 2016/0261465 | A1* | 9/2016 | Gupta | H04L 43/04 |
| 2016/0357957 | A1* | 12/2016 | Deen | G06F 16/1748 |
| 2017/0078322 | A1* | 3/2017 | Seiver | H04L 41/12 |
| 2017/0250869 | A1* | 8/2017 | Voellmy | H04L 41/342 |
| 2017/0279685 | A1* | 9/2017 | Mota | H04L 63/1416 |
| 2017/0279696 | A1* | 9/2017 | Vasseur | H04L 43/50 |
| 2017/0286583 | A1* | 10/2017 | Tirapu Azpiroz | |
| | | | | B01L 3/502707 |
| 2017/0310691 | A1* | 10/2017 | Vasseur | H04L 63/1458 |
| 2018/0077110 | A1* | 3/2018 | Huston, III | H04L 43/18 |
| 2018/0115466 | A1* | 4/2018 | Kazemian | H04L 45/26 |
| 2018/0115469 | A1* | 4/2018 | Erickson | H04L 43/026 |
| 2018/0123941 | A1* | 5/2018 | Flamini | H04L 45/124 |
| 2018/0139129 | A1* | 5/2018 | Dowlatkhah | H04L 45/306 |
| 2018/0145906 | A1* | 5/2018 | Yadav | H04L 45/70 |
| 2018/0309629 | A1* | 10/2018 | Mohanram | H04L 41/145 |
| 2018/0367412 | A1* | 12/2018 | Sethi | H04L 41/0853 |

(56) References Cited

U.S. PATENT DOCUMENTS

2019/0334791 A1* 10/2019 Hopkins ................ H04L 45/02
2020/0007396 A1* 1/2020 Fainberg ............... H04L 41/145
2020/0162371 A1* 5/2020 Musku ................... H04L 45/20

FOREIGN PATENT DOCUMENTS

| JP | 2004-222105 | 8/2004 |
|---|---|---|
| JP | 2006-222808 | 8/2006 |
| JP | 2012-156674 | 8/2012 |

OTHER PUBLICATIONS

International Preliminary Report on Patentability issued in Application No. PCT/US17/57750 dated Apr. 23, 2019.
Extended European Search Report issued in EP Application No. 17862093.6 dated Apr. 21, 2020.
Intention to Grant issued in EP Application No. 17862093.6 dated Apr. 9, 2021.
First Office Action issued in JP Application No. 2019-521482 dated Jun. 23, 2020.
Examination report No. 1 issued in AU Application No. 2017345769 dated Nov. 15, 2019.
Notice of acceptance issued in AU Application No. 2017345769 dated Oct. 27, 2020.
Examination report No. 1 issued in AU Application No. 2021200243 dated Dec. 24, 2021.
Examination Report issued in AU Patent Application No. 2021200243 issued on Sep. 12, 2022.
Allowance issued in AU Application No. 2021200243 dated Jan. 5, 2023.

* cited by examiner

SYSTEMS AND METHODS FOR AN INTERACTIVE NETWORK ANALYSIS PLATFORM

CROSS-REFERENCES TO RELATED APPLICATIONS

This application claims priority to U.S. Provisional Patent Application No. 62/411,365, filed Oct. 21, 2016, titled "SYSTEM AND METHOD FOR PRACTICAL AND UNDERSTANDABLE NETWORK ANALYSIS," by David Erickson, et al., which is incorporated herein by reference in its entirety for all purposes.

BACKGROUND

Networks are growing more and more complex as the backbones of modern information technology systems. A large company may typically employ hundreds or thousands of devices and software components from different vendors to form its network infrastructure. Growth in complexity and size also brings more points of failure, such as forwarding loops, configuration mistakes, reachability issues, or hardware failures.

Diagnosing network failures is difficult for several reasons. First, the forwarding state associated with each network device that defines the overall network behavior is distributed throughout the network and is a result of emergent interactions between devices that are configured in vendor- and device-type-dependent ways. Second, the distributed forwarding states are difficult to monitor—often requiring the network administrator to manually login to the device and conduct low-level tests. Third, multiple administrators or users can edit the forwarding states at the same time, resulting in inconsistent configuration, followed by unexpected forwarding states.

Network models provide a software copy of a network's behavior, upon which a network administrator can better understand current behavior, troubleshoot problems, analyze whether a network is behaving according to policy, and even try out ways to improve performance and fault tolerance. However, the larger the network, the more difficult it can be to model, analyze, and diagnose issues, because of the complexity and overwhelming amounts of data associated with large networks with many devices. Thus, techniques and methods of providing an intuitive and interactive platform for network analysis are needed to aid in diagnosing problems in large or entire networks.

BRIEF DESCRIPTION OF THE DRAWINGS

Various embodiments or examples of the invention are disclosed in the following detailed description and the accompanying drawings.

DETAILED DESCRIPTION

Figure 1:
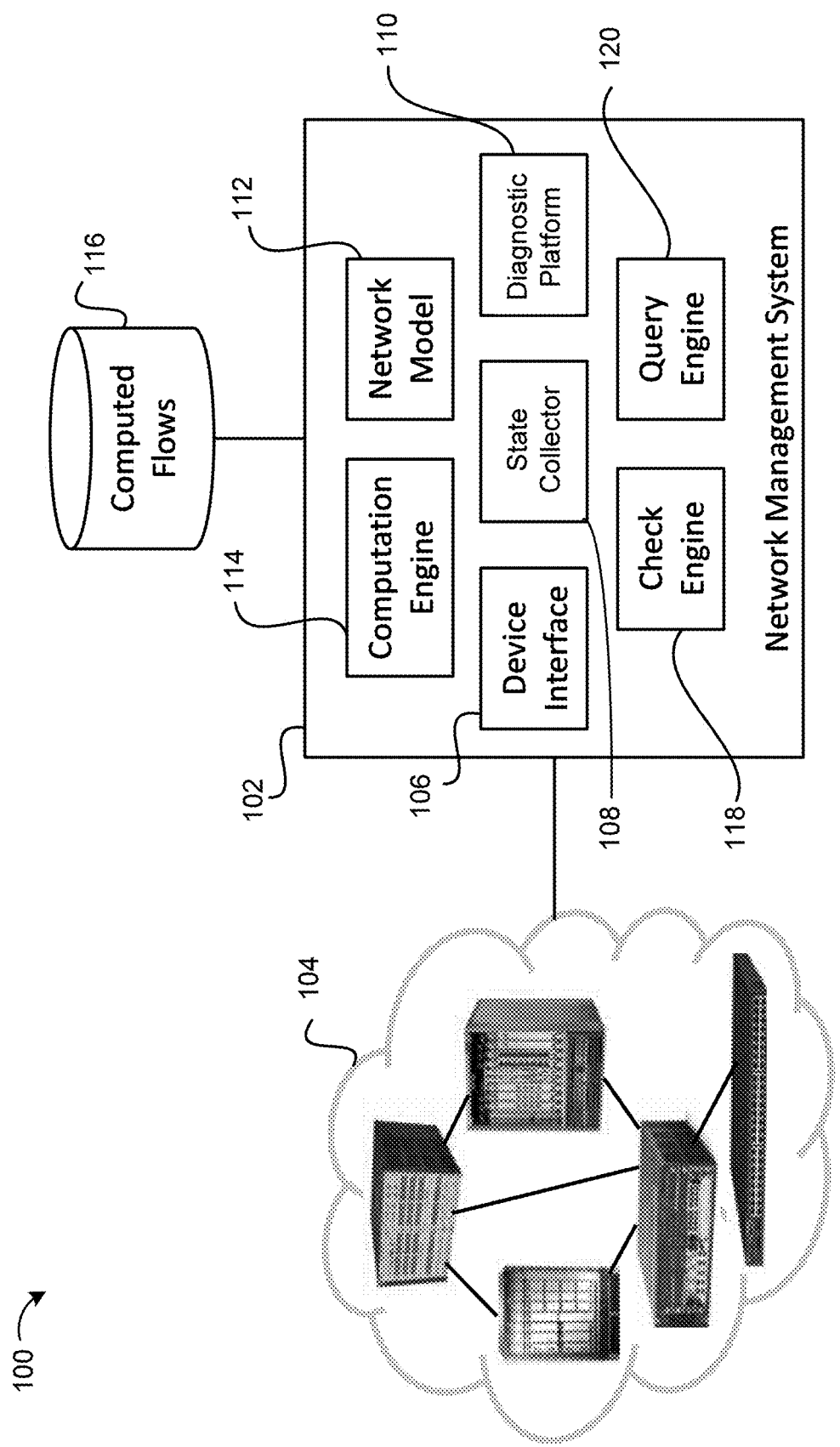
FIG. 1 illustrates a high-level diagram of a network analysis system, in accordance with an embodiment of the present invention.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Within a network, data may be transmitted via packets from one networking device to another. Networking devices forward packets based on their header bits, and network behavior may be modeled using a plurality of different types of models. In one embodiment, a data-plane model may be implemented to model the network. In a data-plane model, the network behavior of the data being transmitted is represented by packets and their behavior through the network may be referred to as traffic, flow paths, traffic flow, etc. In some embodiments, state information (e.g., configuration data, forwarding states, IP tables, rules, network topology information, etc.) may be received from devices in a network, or obtained from another entity or network-data source. The state information may be parsed by a network analysis system and used to generate a network model, such as a data-plane model. Generally, network models describe how the network processes packets of data. Using the model, the network analysis system may be able to identify possible flow paths taken by packets of data through the network. The network analysis system may then use the information gathered from applying the network model to analyze the network and identify network behavior, such as types of traffic, frequency of rule matches, what kind of transformation occurs as traffic flows through the network, where the traffic gets dropped, etc.

As noted, existing network analysis techniques use operations such as ping and traceroute; however, these operations are insufficient in diagnosing all failures. Not only are these operations limited and incomplete in their visibility into the network functions, existing network analysis tools often can only diagnose issues when a problem has occurred. Accordingly, existing network analysis techniques are unable to preemptively detect issues and develop resolutions for currently manifesting issues. Furthermore, the presentation of network data in existing network analysis tools is often inefficient. Further, manually assembling a coherent view for troubleshooting is challenging because with larger networks, the amount of network data may be vast and difficult to maneuver, specifically in determining what data is relevant for troubleshooting. As such, embodiments of the present invention provide improved methods and tools to analyze, model, visualize, manage, and verify networks in an automated and systematic way.

One system according to various embodiments includes improved techniques for automating troubleshooting of network issues by modeling a network in a vendor and protocol-independent way. The network analysis system may then utilize the model to present an interactive platform to enable searches and to test policy invariants. A network administrator, using the interactive platforms presenting relevant network data, may then preemptively discover problems before the problems occur on the network and affect customers using the network. The interactive platform can also enable improved and faster diagnosis of problems, and provide a higher level of confidence that the network is behaving as expected.

Another approach to automating troubleshooting is to collect flow counters. By combining the data from flow counters into a single view, a network administrator may be able to trace traffic throughout a network and identify current issues affecting a network. However, such systems may lack pieces critical to their effective usage in a real network context, both in how data is gathered as well as how data is made available and actionable to the user. For example, troubleshooting a network remotely, using existing network analysis tools may cause the acquisition of state and configuration data from a range of network devices. Such data collection, if done without coordination, can enable conflicts between multiple users and multiple tools, or cause unwanted alarms to trigger when the data is being collected.

As another example, the deluge of raw information produced by a network analysis system may be overwhelming, including a lot of data that may not be relevant to diagnosing issues. Existing network analysis tools may not present the data such that it is evident which fields are relevant for forwarding or which IP addresses are treated differently from others. Even experienced users or network administrators, using existing network analysis tools, may still be overwhelmed by the overwhelming data associated with all possible traffic paths.

Embodiments of the present invention address the above-mentioned technical problems that exist with current network analysis tools. Embodiments of the present invention provide improved techniques for collecting relevant network data such that it may be aggregated and presented to a network administrator that is intuitive and compatible with various network devices and networks of any size.

FIG. 1 illustrates a high-level diagram 100 of a network analysis system, in accordance with an embodiment of the present invention. As shown in FIG. 1, network analysis system 102 can connect to a network 104 that includes a plurality of network devices (e.g., switches, routers, firewalls, load balancers, gateways, bridges, and other network devices). Each network device may be produced by a different vendor and may implement different operating systems, control interfaces, protocols, etc. Accordingly, network analysis system 102 can include a plurality of device interfaces 106, which may include vendor-specific, device-specific, and/or protocol-specific interfaces, through which network analysis system 102 can communicate with each network device.

A network device may include one or more interfaces. Network devices may be connected to interfaces of other devices to form a network. Each network device may contain configuration and state data, which may be used to determine how to modify, forward, and/or drop a packet arriving on an interface of the network device using rule tables. The rule tables of each network device may include a set of rules, each rule having a match and one or more corresponding actions. When a packet satisfies the match of the rule, then the corresponding actions are performed on the packet, for example, actions to modify, forward, and/or drop a packet.

The network 104 includes a plurality of network devices that are interconnected by paths, which may define a sequence of devices connected by links that a packet can traverse. A network function may be an individual step or functional unit within a device that contributes to determining how a packet is modified, forwarded, and/or dropped by the device (e.g. IP routing, ARP lookup, L2 forwarding, MPLS label pushing/popping/swapping, access control permit/deny, network address translation). Network behavior information may include a sequence of network functions along a path that cause one or more packets to take the same path in the network and undergo the same transformations.

In some embodiments, network analysis system 102 can include one or more state collectors 108 and diagnostic platform 110. The state collectors 108 can communicate with the network devices using device interfaces 106 to obtain state information for each network device. State information may vary from network device to network device and can include one or more of forwarding states, configuration files, internet protocol (IP) tables, topology information, interface states, counters and rules. State information may be parsed by the parsers to generate a network model 112, which describes how data is processed in the modeled network. A computation engine 114 can use the network model 112 to identify possible flow paths that packets may travel over in the network model 112. In some embodiments, the flow paths may be stored in a data store, such as computed flows data store 116, which may be stored locally with network analysis system 102 or remotely. The diagnostic interface 110 may then communicate with the computation engine 114, network model 112, and state collector 108 to determine relevant data for presentation in an interactive platform according to various embodiments.

In some embodiments, network analysis system 102 can further include a check engine 118 and a query engine 120. As described further below, check engine 118 can analyze flow paths stored in data store 116 to identify various properties, such as path, header, hop counts, quality of service (QoS), queues, ports, physical devices the flow traverses, tables within the device, forwarding type of the packet, packet header modifications, encapsulated packet header properties, or allocated bandwidth, or other properties. This enables the modeled network to be analyzed to verify that the network is functioning according to prescribed standards (e.g., set by a network administrator, developer, or other entity). Query engine 120 may be used to identify particular flow paths that meet queried criteria (e.g., failover flow paths between specified points, flow paths that traverse particular network devices in a particular order, etc.). According to various embodiments, the diagnostic interface 110 may then communicate with the query engine 120 and check engine 118 to determine relevant data for presentation in an interactive platform according to various embodiments.

To make problem diagnosis and resolution as easy as possible, according to various embodiments, information from a network analysis system may be presented in terms that are familiar to network administrators, and in a form that reveals what information is most relevant. The more effectively a system can suggest, evaluate, and explain potential root causes, the more quickly a problem may be resolved, saving time and money. According to various embodiments, the network analysis system may analyze or visualize networks in an interactive, useful, and practical manner. For example, embodiments provide systems and methods to efficiently collect the necessary input data from networks for analysis. The process of collecting and feeding data into the network analysis system according to various embodiments may be straight forward, relevant, and frictionless, such that the network analysis system is flexible enough to enable a user to easily collect the data required to compute or update the model for any portion of the network at any time, from anywhere.

Additionally, systems and methods according to various embodiments compute relevant and useful information such that it may be presented to users in an understandable, interactive, and actionable form. The visualization may be flexible enough to present data for a range of protocols and topologies. More importantly, the network analysis system according to various embodiments may provide suggestions and reasons to help the user diagnose potential root causes of problems, rather than merely present examples of symptoms and raw data.

Embodiments of the present invention provide systems and methods that can efficiently collect data from networks and make them available to systems that need the data for various computations. In some embodiments, the computations may include modeling the network, analyzing the network for configuration issues, verifying network properties, or validating expected behaviors in the network.

Embodiments of the present invention provide systems and methods that provide views to users that are easy to understand, easily navigable, and easier to act upon, as a result. The invention provides a rich set of features and views that enable users to understand a wide variety of things about their network and ask questions about their network.

In some embodiments, information received from devices in a network may be parsed and used to generate a network model, which describes how data packets are processed by the network. The model presents possible flows of traffic through the network, and may be used to identify and analyze network behavior, such as types of traffic, what kinds of transformations occur through the network, where traffic gets dropped, etc.

In some embodiments, traffic flow paths may be classified along various dimensions such as paths, values of header fields at different devices in the network, path length etc., to generate some of the filters that can help refine the trace search results. A network manager or administrator or a user of the network analysis system may use the suggested filters to refine the trace and rapidly converge to the relevant traffic of interest. For example, the network manager or administrator may search for traffic traces from source IP address 10.0.0.10 to IP subnet 10.1.2.0/24 and the network analysis system presents the network manager or administrator with the list of devices [router1, router2, router3, router4] traversed by the traffic flow path results and that some traffic flow paths relevant to the search are dropped at router2. The network manager or administrator then selects router2 and chooses to only view the dropped traffic. The network analysis system then presents the network manager or administrator with only those traffic flow path results that match these additional filters as well.

Embodiments can provide an interface where the user can view virtual packet traces. These are computed by the network analysis system without sending actual packets into the network. The trace itself may comprise traffic that traverses different VLANs, or several different IP addresses, rather than describe only a single packet. In some embodiments, the network analysis system can also present the user with traces that correspond to individual actual packets that may be seen in the network.

In some embodiments, the network analysis system can use an improved visual method for presenting forwarding behavior experienced by one or more packets along a path, where each view displays information from potentially multiple forwarding layers. Specifically, this visual method may include one or more of the following four parts: (1) Behavior breakdown by functional layer; (2) Multiple behaviors along a single path; (3) Exploration of packets experiencing a behavior; and (4) Request response traffic display.

Figure 4:
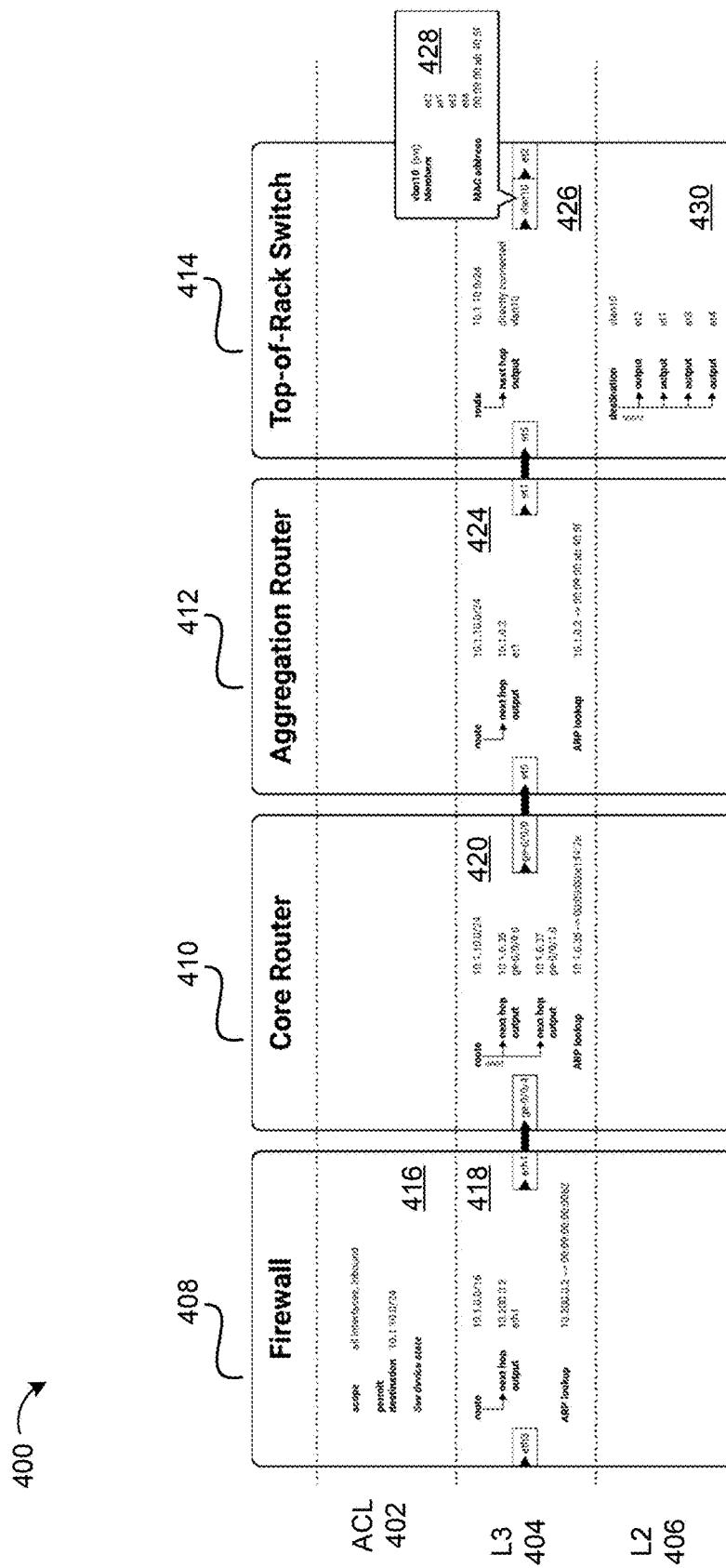
FIG. 4 illustrates an example method of analyzing network traffic, in accordance with an embodiment of the present invention.

First, an interface according to various embodiments may provide a behavior breakdown by functional layer. FIG. 4 illustrates an example method of analyzing network traffic, in accordance with an embodiment of the present invention. In the example shown in FIG. 4, network behavior 400 at different functional layers may be shown to the user. The behavior breakdown by functional layer may describe the network's behavior along a path in terms of steps commonly understood by network operators, which may also be referred to as network functions. These network functions may include but are not limited to the following: IP routing, ARP resolution, media access control (MAC), forwarding, spanning tree broadcast, access control, load balancing, network address translation, policy based routing, multiprotocol label switching (MPLS) and various encapsulation-deencapsulation functions like FabricPath, VXLAN, GRE tunnels etc. Each network function may link to sources of data associated with the device, which explain the forwarding behaviors (e.g., running configurations, forwarding state outputs, and computed protocol state, like effective BGP routes).

As shown in FIG. 4, traffic behavior along a path may include, for example, a traffic sample (e.g., a packet of data) which comes from the Internet, into a firewall 408, and then across multiple devices in a data center, such as a core router 410, an aggregation route 412, and a top-of-rack switch 414. Every network device on the network (e.g., firewall, routers, and switches) may have an access control list (ACL) 402. An access control list 402 may include a list of filtering behaviors attached to a device, for example, an ACL may specify a list of ports for trusted applications, a list of IP addresses corresponding to untrusted servers, or other uses of header fields to restrict or permit access. Each entry in a typical ACL may specify a subject and an operation. For example, at firewall 408, the ACL 402 may provide configuration data 416, which may include a subject, applicable routing information, and state information. In configuration data 416, for example, the subject or scope of configuration may be defined, such as all inbound interfaces (i.e., applies to all incoming packets). Additionally, the configuration data 416 may include an action such as to permit or deny matching traffic. The configuration data 416 also specifies criteria for matching packets such as a destination address or other header values. The configuration data 416 may link to sources of data associated with the device, such as running configurations, forwarding state data and other collected or inferred state data.

Every network device on the network (e.g., firewall, routers, and switches) may have the ability to operate at different network functional layers, for example, the L3 layer 404 (e.g., network layer) and L2 layer 406 (e.g., data link layer). The data link layer or layer 2 is the second layer of the seven-layer OSI model of computer networking. This layer is the protocol layer that transfers data between adjacent network nodes in a wide area network (WAN) or between nodes on the same local area network (LAN) segment. The data link layer provides the functional and procedural means to transfer data between network entities and according to various embodiments, the network analysis system, in the L2 layer, may detect and possibly correct errors that may occur in the physical layer (e.g., L1 layer). The network layer is responsible for packet forwarding including routing through intermediate routers. The network layer provides the means of transferring variable-length network packets from a source to a destination host via one or more networks. Within the service layering semantics of the OSI network architecture, the network layer responds to service requests from the transport layer and issues service requests to the data link layer.

At the L3 layer 404, the configuration data 418 may have different information than the configuration data 416 at the ACL 402. The L3 layer 404 configuration data 418 may include routing information, such as an address for a next device, output, or other relevant routing information. The configuration information 418 may also include the input and output interfaces for traffic along the flow path. The configuration information 420 at the L3 layer 404 of the core router 410 may include routing information such as the next hop or output interface. The packet may then travel to the aggregation router 412 from the core router 410 based on configuration data 420. The configuration data 424 at the aggregation router 412 may then provide routing information to the top-of-rack switch 414. The top-of-rack switch 44 may have configuration data 426 at the L3 layer 404 and configuration data at the L2 layer. The network functions that affect the forwarding of the packet at each stage (e.g., network device) are clearly separated, and at each stage, links back to relevant configuration and state. are exposed.

Second, an interface according to various embodiments may also provide multiple behaviors along a single path, which allows a network manager or administrator to explore different types of forwarding behaviors that may exist on a selected path. For example, a path along three devices A→B→C, may consist of three different forwarding behaviors:

Packets are L2 forwarded at A and B, and then L3 routed at C.

Packets are L2 forwarded at A, and then L3 routed at B and C.

Packets are L2 forwarded at A, NAT-translated at B, and then L3 routed at C.

Third, an interface according to various embodiments may also enable a network manager or administrator to explore packets experiencing a behavior. The ability to explore and understand multiple packets that are affected by the end-to-end behavior in an interactive fashion enables a network administrator or manager to preemptively diagnose problems with the network. The network analysis system, according to various embodiments, may present the class of packets experiencing the same end-to-end behavior along a path. In some embodiments, the user (e.g., network administrator or manager) may be able to interactively explore the network by specifying values for certain header fields, to which the network analysis system responds with an updated set of packets satisfying the constraints specified by the user.

To illustrate, the class of packets outlined below may be experiencing the specific behavior:

All packets with VLAN tag 100, except
    IPv4 packets with IP destination address in the subnet 100.100.0.0/16, and
    IPv4 packets with IP source address in the subnet 200.200.0.0/16

According to various embodiments, the user may be able to specify the value of the IP destination header field as 100.111.100.100. As such, the network analysis system may respond by limiting the set of possible packets as:

All packets with VLAN tag 100 and IP destination 100.111.100.100
    Except IPv4 packets with IP source address in the subnet 200.200.0.0./16.

If the user specifies another header field value as IP source 300.300.300.300, then the network analysis system may respond with:

All packets with VLAN tag 100, IP destination 100.111.100.100 and IP source 300.300.300.300.

Alternatively, if the user specifies the header field value as IP source 200.200.200.200, the network analysis system may respond with "NULL" as there is no packet that belongs to the original set and also satisfies the header field value constraints specified by the user.

Fourth, an interface according to various embodiments may also enable a network manager or administrator to investigate both request and response traffic. As such, the interface may be enabled to allow the user (e.g., network manager or administrator) to quickly search and inspect traffic that may be generated in response to other traffic. In some embodiments, the user interface provides a way to easily toggle between the request and response traffic. In other embodiments, both request and response traffic may be shown to the user simultaneously for visual inspection, comparison, and analysis.

In some embodiments, the platform may mark some traffic flows as "stateful," which indicates a traffic flow that may appear in the network only if corresponding request traffic has previously entered the network. In some networks, stateful response traffic may be handled differently by the devices along the path depending on whether the prior request traffic has been seen. For example, a stateful firewall device may typically drop traffic in one direction, but the traffic may be permitted to flow through if the request traffic was previously seen in the network.

Figure 5:
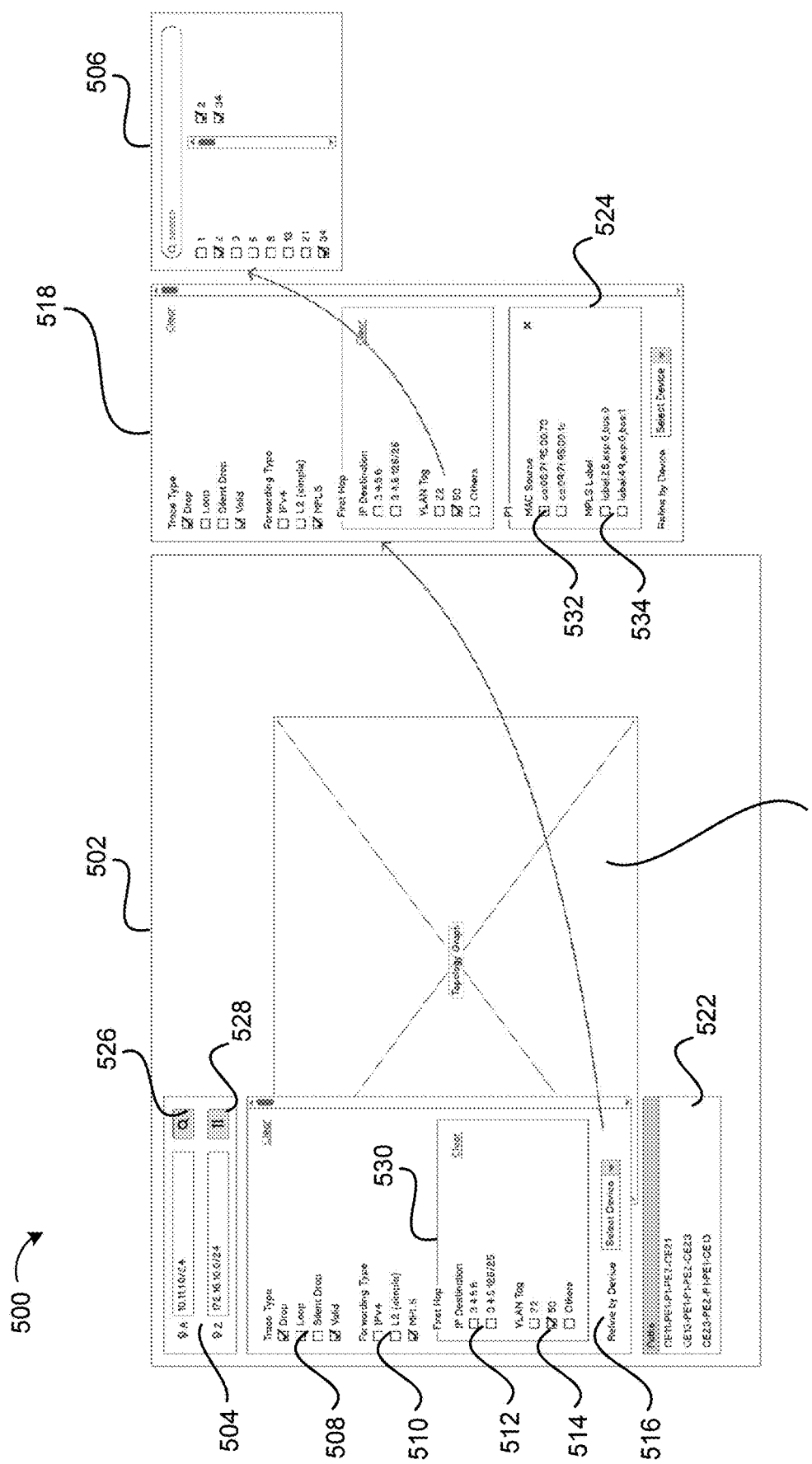
FIG. 5 illustrates an example interface for network analysis, in accordance with an embodiment of the present invention.

FIG. 5 illustrates an example interface for network analysis, in accordance with an embodiment of the present invention. The example interface 500 in FIG. 5 illustrates a faceted search for network traffic according to various embodiments. In some embodiments the network traffic flow path results are classified along various dimensions such as paths, values of header fields at different devices in the network, path length etc., to generate some of the filters that can help refine the search results. A network manager or administrator or a user of the network analysis system can use the suggested filters to refine the traffic flow paths and rapidly converge to the relevant traffic of interest. For example, the options may filter by traffic type 508 or the end-to-end forwarding outcome for the traffic path, forwarding type 510. Additionally, the network manager or administrator may search for traffic flow paths matching some criteria, for example, traffic from source IP address 10.11.1.0/24 to IP subnet 172.16.10.2/24 as shown in 504, specifying a source A location to destination Z location. Display 504 may be a window, frame, pane, or any other suitable interface. The network analysis system may also present to the network manager or administrator with the list of devices 516 (e.g., router1, router2, router5, router4) traversed by the flow paths 522 and may determine, for example, that some flow paths relevant to the search are dropped at router2. The network manager or administrator may then select router2 and choose to only view the dropped traffic flow paths. The network analysis system then presents to the network manager or administrator with only those flow path results that match these additional filters as well.

Window 502 may display another frame or pane 520 with a topology graph. While interface 500 is an example of a faceted search implementation, embodiments of the present invention include any general visual representation to facilitate a faceted search. For example, the filters may be shown on a pop-up window 518, an overlay, pane, frame, window, or any other suitable interface. Window 502 may also include information for a first hop 530, in which the user may select or filter by various categories such as IP destination 512 or VLAN tag 514. Window or frame 506 is an example display of additional filters that may be provided based on the user's selection of VLAN tag 514. Additionally, window 518 may provide other information and filters, for example P1 at 524 that includes selectable options for MAC Source 532 and MPLS label 534.

As shown in FIG. 5, embodiments of the invention provide means of generating a search interface for network traffic. A faceted interface for network traffic search may include search fields that are derived from an initial source-to-destination traffic query. As the user selects elements of the path, new search facets may be dynamically generated within the interface. For facets with long lists of values, a space-efficient multi-select control may be used. In faceted search, data attributes, such as names, models, and prices, may be discovered based upon an initial search, then presented to the user as clickable choices. Applying an interactive and intuitive interface according to various embodiments to network traffic search enables users to see which search terms are available, such as header fields or traffic types, and to efficiently reduce irrelevant queries by using the available data fields as filters. Header fields may include values seen at any layer of the packet, including ports and layer 2 through 7 fields. Traffic types may include different outcomes of a packet after entering the network, including explicit drops by configuration, implicit "black holes" due to no matching rules, inadmissible traffic (e.g., where the input device has no knowledge of handling a particular packet type), loop, and valid (where traffic exits the network).

According to another embodiment, the network analysis system may provide an interface for common traffic behavior identification. The interface may include an automatic way to group examples of flow traffic that shares one or more common elements. For example, when a network is handling packets in an unexpected way, the user (e.g., network administrator or manager) sees a single instance of the behavior at hand, rather than potentially thousands of specific examples of potential traffic that all share the same common behavior. Identifying common traffic behavior may be relevant for users because many unique traffic flows may experience the same unexpected behavior, despite coming from different locations or having different header values.

To illustrate, in one example, a loop may be caused by a Router A with a static routing entry that forwards to Route B, whose default route points back in the direction of Router A. The same forwarding loop may be experienced by packets entering the loop from multiple locations in the network. In another example, a black-hole (e.g., an implicit packet drop by a device in the network) may be caused by a missing default gateway entry or missing VLANs on one side of a link. The same black hole may be experienced by packets entering from multiple locations in the network. In another example, many different kinds of traffic may take the same path, such as an overly long path, or one that skips a required waypoint. The same traffic path characteristic may be experienced by packets entering from multiple locations in the network.

Figure 6:
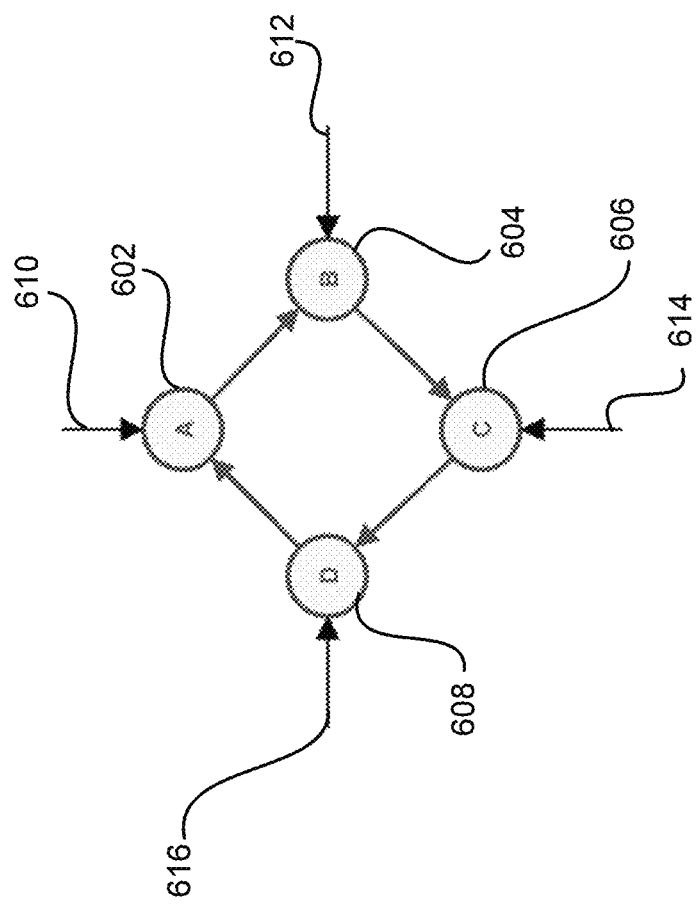
FIG. 6 is a diagram illustrating an example method of analyzing traffic paths, in accordance with an embodiment of the present invention.

FIG. 6 is a diagram illustrating an example method of analyzing traffic paths, in accordance with an embodiment of the present invention. In the example traffic flow 600 of FIG. 6, traffic may enter from multiple locations but traverse through the same forwarding loop. Traffic can enter the network at four nodes: node A 602, node B 604, node C 606, and node D 608. The traffic may enter node A 602 at path 610, node B 604 at path 612, node C 606 at path 614, and node D 608 at path 618. Assuming each node has one input port, then four loops are possible, covering paths ABCD, BCDA, CDAB, and ADCB. Each additional input port in the network may yield another possible path that results in what is effectively the same loop. As such, according to various embodiments, by providing an interface for identifying common traffic behavior, the user may be enabled to identify and determine whether the traffic flow is a single loop, regardless of the number of traffic paths that end up in the same loop, ABCD.

Figure 7:
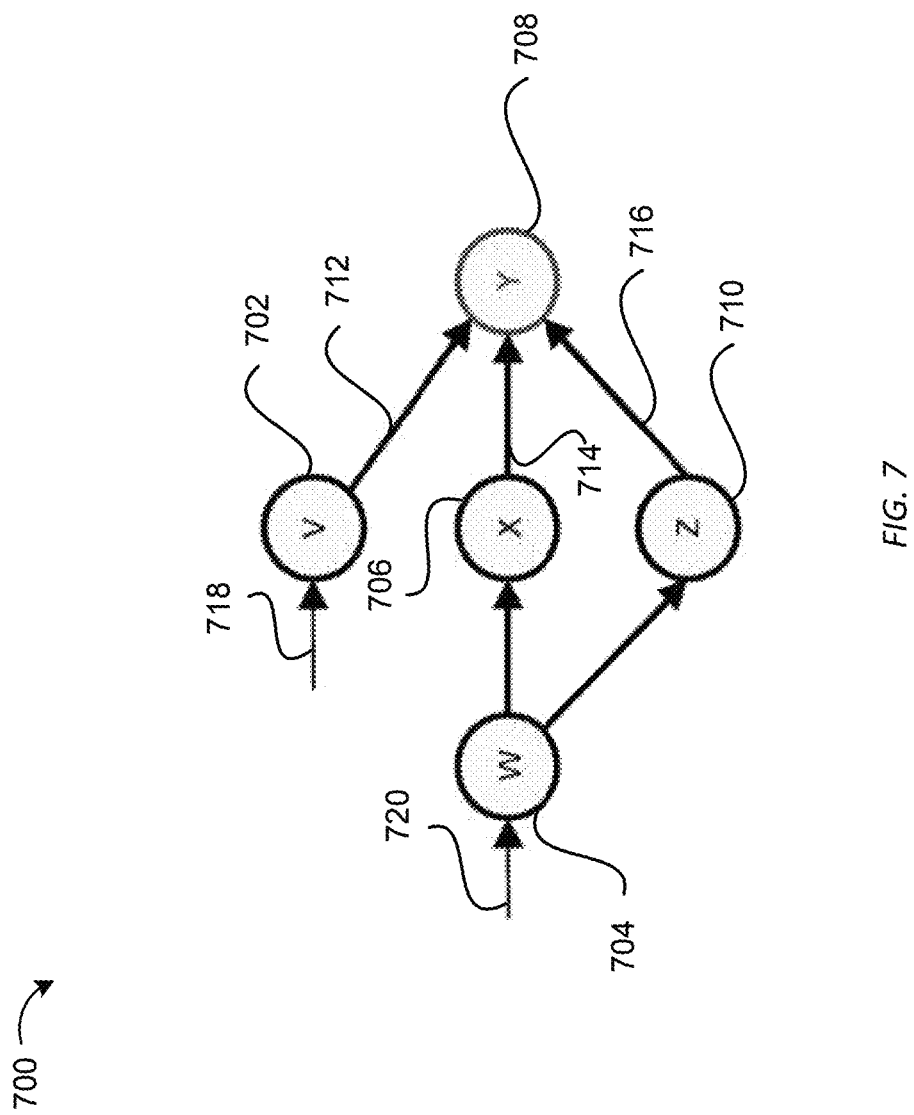
FIG. 7 is diagram illustrating an example of method of analyzing traffic paths, in accordance with an embodiment of the present invention.

FIG. 7 is diagram illustrating another example of method of analyzing traffic paths, in accordance with an embodiment of the present invention. In the example traffic flow 700 of FIG. 7, traffic may traverse through multiple paths and become blackholed at the same device. In this example, the traffic may flow to a node that then drops the traffic. For example, traffic can enter the network at one port through path 718 on node V 702 and through path 720 at node W 704. From node V 702 and node W 704, three paths are possible, covering paths VY, WXY, and WZY. However, all the paths converge at node Y 708 through path 712 from node V 702, path 714 originating from node W 704 to node X 706, and path 716 originating from node W 704 to node Z 710. As such, according to various embodiments, by providing an interface for identifying common traffic behavior, the user may be enabled to identify and determine a single class of traffic that may all get dropped at node Y 708.

Without embodiments of the present invention, a user may waste time investigating and tracing through countless paths that may be redundant, and as a result, may be unable to identify and determine the most important traffic cases among the set of possible ones. However, according to various embodiments, by providing an interactive platform for identifying common traffic behavior, a user can quickly diagnose unexpected network behavior, while viewing a fraction of the information.

In another embodiment, the network analysis system may provide an interactive platform for detecting and filtering adversarial or uninteresting traffic. When analyzing traffic in a network, a large number of potential traffic paths may be considered irrelevant to expose to a network administrator. For example, irrelevant network data may include misconfigured hosts or traffic that is immediately and explicitly dropped. Such traffic paths may only occur when a host is accidentally or intentionally misconfigured.

Presenting these irrelevant potential traffic paths may be misleading or confusing to a network administrator. Furthermore, computing and presenting irrelevant traffic may add additional processing and storage work for a network analysis system. As such, the network analysis system according to various embodiments provides a method of automatically identifying traffic flows that are the result of an "adversarial" traffic analysis, and are unlikely to be seen in practice. Such traffic flows may be filtered in a default view or specifically identified for an advanced user.

To illustrate, one example of an adversarial traffic flow can include traffic generated from hosts configured with an IP gateway that may not be the nearest gateway based on the network topology. In one embodiment, the network analysis system provides a method to identify whether a flow that enters an input interface and is destined to an IP address external to the configured subnet for that input interface may be routed through the nearest gateway.

Figure 8:
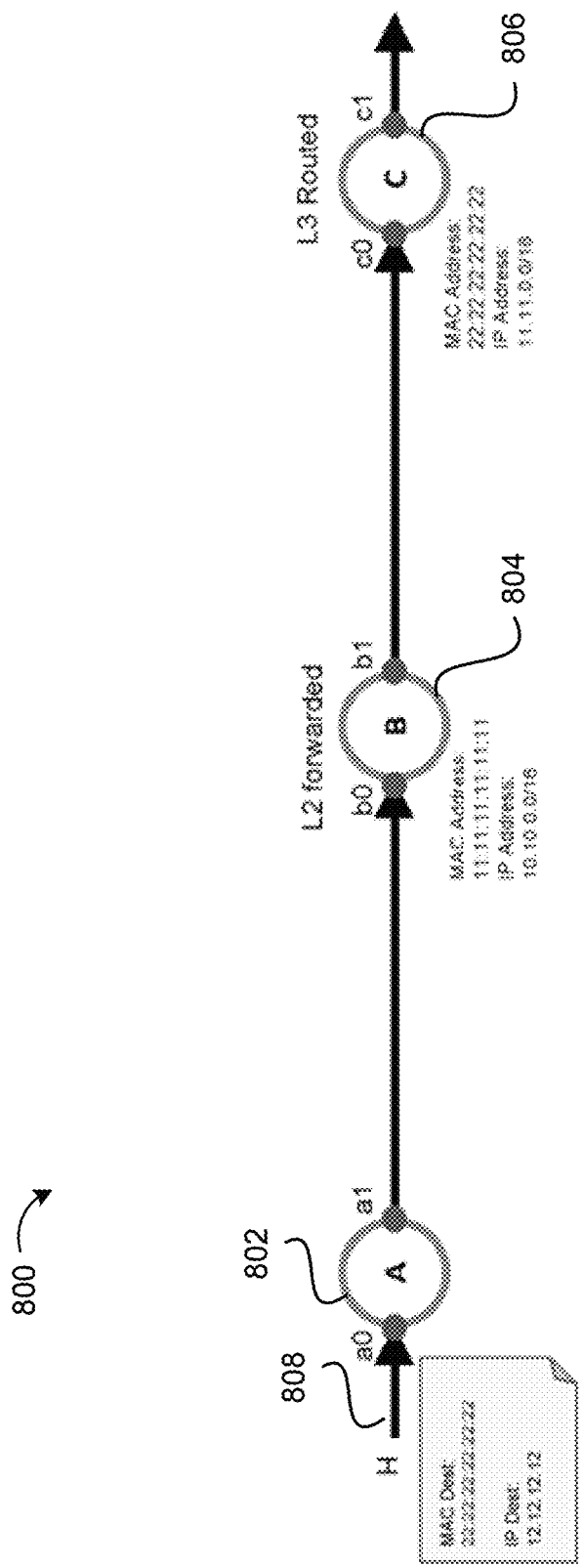
FIG. 8 is diagram illustrating an example method of analyzing traffic traversing through a gateway, in accordance with an embodiment of the present invention.

FIG. 8 is a diagram illustrating an example method of analyzing traffic traversing through a gateway, in accordance with an embodiment of the present invention. For example, the traffic flow 800 of FIG. 8 demonstrates how a class of traffic may traverse through a non-nearest gateway. The traffic may be generated from a host connected to node A 802 and enter through path 808, whose nearest IP gateway is at node B 804, and which handles the IP subnet of 10.10.0.0/16. However, the host may be wrongly configured with an IP gateway of node C 806, which corresponds to IP subnet 11.11.0.0/16. When the host tries to send an IP packet to an external address, such as 12.12.12.12, it trusts that the gateway at node C 806 should handle the packet, so it sets the MAC address of the packet to the MAC address for node C 86, which is 22:22:22:22:22:22. Since Layer 2 (MAC) forwarding occurs before Layer 3 (IP) forwarding, the packet is Layer 2 forwarded to node C 806, and then Layer 3 routed.

In another example, the network analysis system according to various embodiments may enable a user to identify whether a flow that enters an input interface and is destined to an IP address in the same subnet may be routed through an IP gateway, when an L2-forwarded path should suffice.

Furthermore, traffic generated from hosts may include false (i.e., spoofed) source IP addresses. As such, according to various embodiments, the network analysis system may identify traffic generated by hosts with false IP addresses. Identifying traffic generated by hosts with false source IP addresses may involve multiple techniques including, but not limited to, matching the source IP address of the traffic against the interface subnet on which the host resides and matching the source IP address against all the subnets that are routable to the location of the host.

Another adversarial traffic flow includes traffic not admitted into the network. In one embodiment, the network analysis system may identify traffic that may not be admitted by the first interface in the network that the traffic encounters; for example, non-IP traffic dropped by an L3 interface. Additionally, traffic may be destined to the MAC address of L2 interfaces in the network. As such, according to various embodiments, the network analysis system may identify all traffic destined to the MAC addresses of L2 interfaces in the network. However, in practice such traffic may be unlikely and therefore irrelevant, because L2 interfaces do not have IP addresses. Accordingly, it can be difficult for end-hosts to have a practical way to query for the MAC addresses of these interfaces.

In another embodiment, the network analysis system may provide an interactive platform for network-wide configuration and state search. The platform may support search over network elements such as IP addresses, MAC addresses, VLANs, devices, device interface descriptions, and any other named field found within a network. The search results may be automatically categorized and grouped into user-understandable categories that enable (1) interactive and intuitive exploration of results and (2) quick refinement of the query based on the category of interest. For example, when a user enters an IP address, the response may include results of various types that match the IP address, including but not limited to: routes to the IP address, interfaces or hosts with matching IPs, devices with matching management IP addresses, load balancer configurations relevant to the IP address, textual matches from configuration and state on network devices, etc.

In some embodiments, the user interface may categorize the search results automatically and may expose these categories to the user. In some embodiments, the search capability may be exposed by a unified search bar for networking where the user may enter any query and the result type or category may not necessarily be specified. The network analysis system according to various embodiments may automatically detect the type of query and the platform may present the corresponding types of results to the user. For example, if a user searches for a network device name, the interface may automatically display results relevant to the device. Examples of such information may include the configuration and state collected from the device, the role of the device in the network, its manufacturer, model, management IP address, OS version etc. As another example, in the same search bar, if the user searched for an IP address that corresponds to a host, then the user interface may directly present the user with information about the matching host such as the hostname, mac address etc. The same search bar may also be used to search for other networking-related entities such as traffic behaviors or paths in the network.

Figure 11:
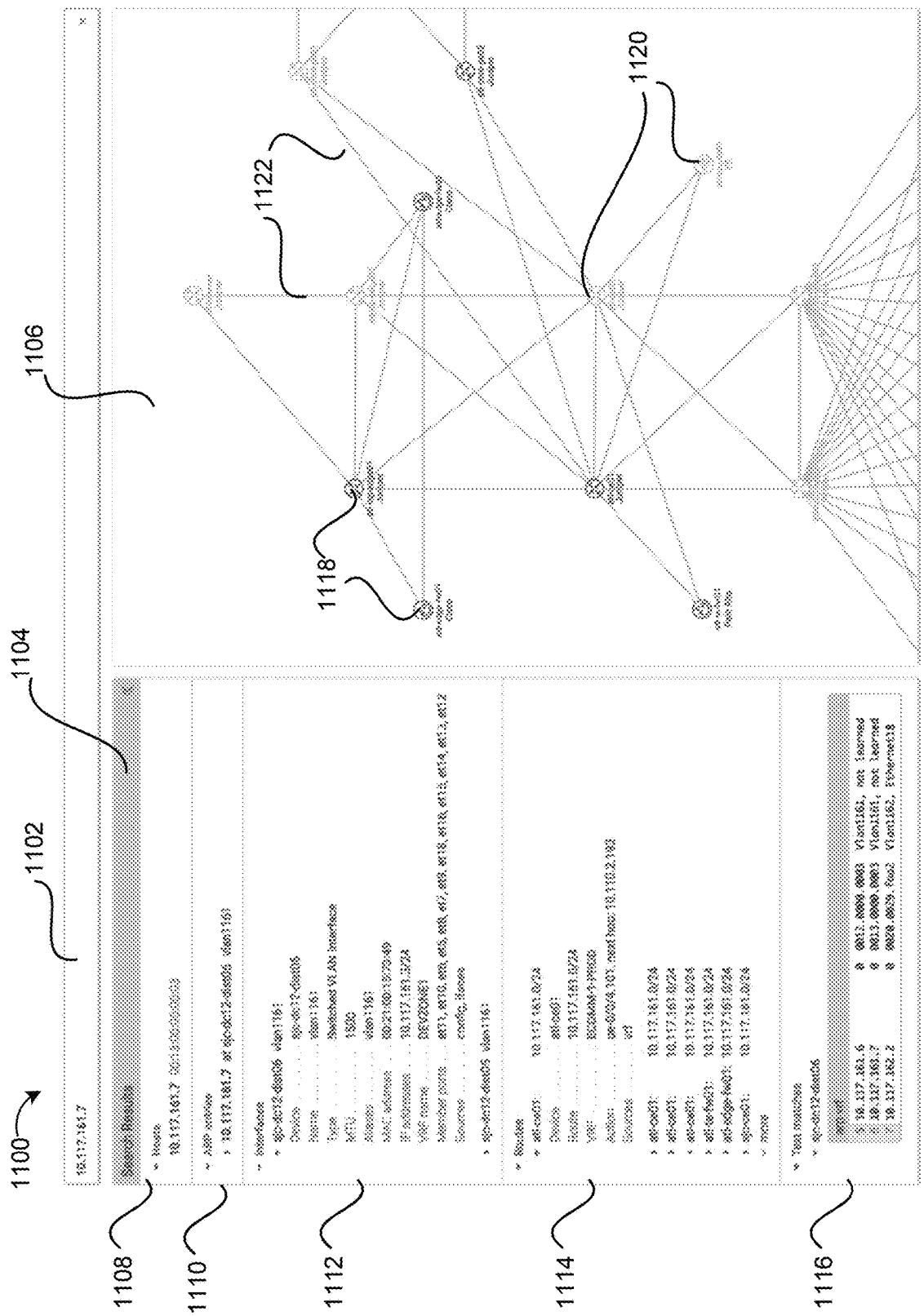
FIG. 11 illustrates an example visual representation of an IP search, in accordance with an embodiment of the present invention.

FIG. 11 is a diagram illustrating an example method of analyzing and searching for configuration or state data in the network, in accordance with an embodiment of the present invention. FIG. 11 illustrates an example interface 1100, however embodiments of the present invention include any general visual representation that enables a user to analyze and search for configuration or state data in the network, using various filters to limit the configuration and state being searched for in real-time. Searching for an IP address in the universal search bar 1102 may show results that are categorized into different groups displayed in the search results 1104, such as discovered hosts 1108, ARP entries 1110, interfaces in the network 1112, routing table entries to the corresponding subnet in different devices 1114, text matches in the configuration and state information collected from devices 1116, etc. Additionally, the network topology 1106 may also be displayed to the user any relevant devices 1118 or topology links 1122 in the network. For each result, the relevant matching criteria might also be highlighted, especially in cases where this is not obvious. For example, for the text matches, the relevant lines of text are displayed with some amount of context (few preceding and following lines) and the matching portions of text are highlighted. When certain devices are not within the result set, a device 1120 may not be highlighted, or it may be displayed in a lighter color, in the background, or in another manner such that a relevant device 1118 is highlighted and made noticeable to the user.

In some embodiments, the configuration or state data results in different categories may have links to other related network elements that may be of interest. For example, a network interface result may have links to the device containing the interface, the interfaces that are connected to this interface by links, and other properties of the interface such as the VLANs configured on the interface, hosts discovered on the interface, etc.

Figure 12:
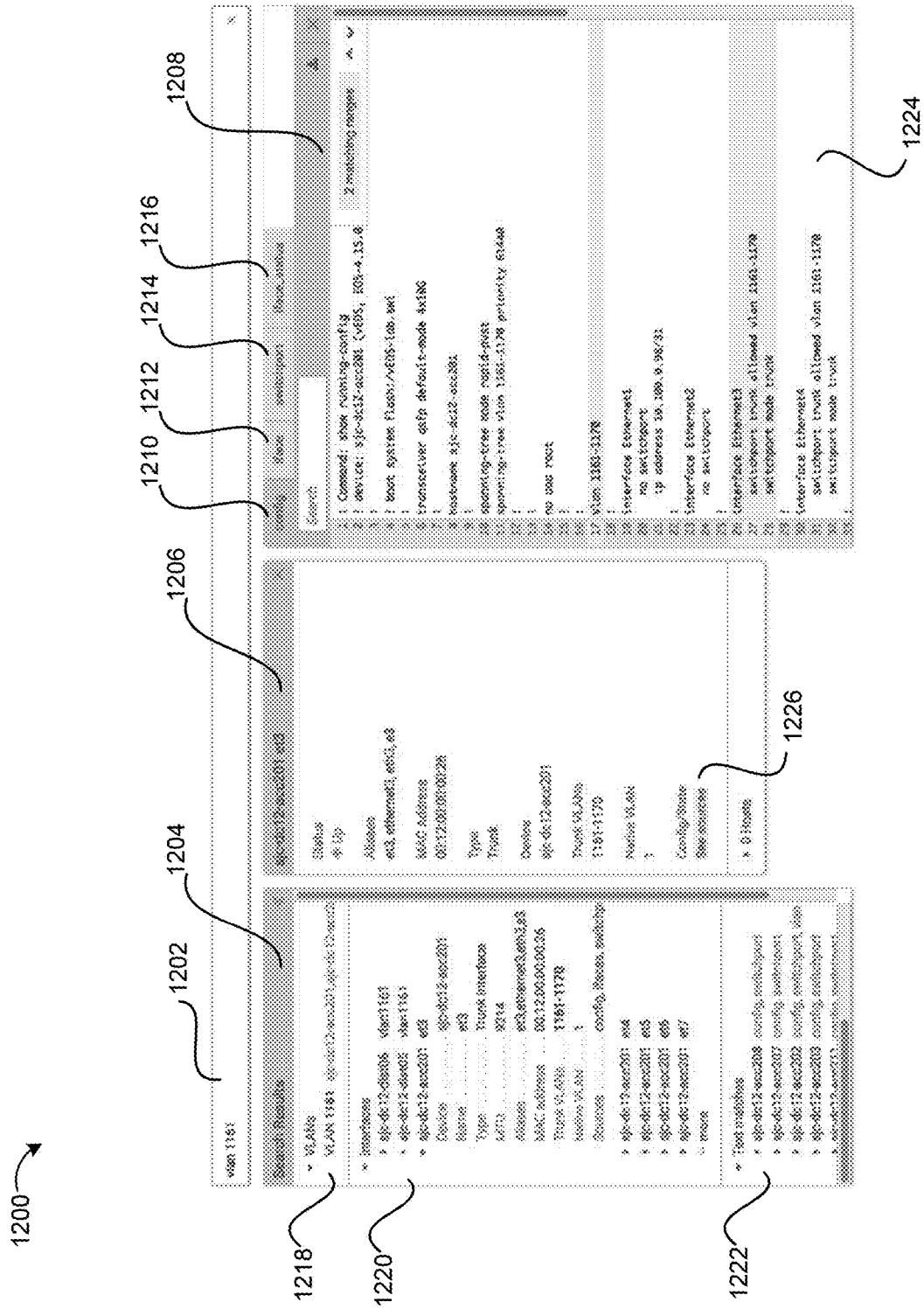
FIG. 12 illustrates an example visual representation of a VLAN search, in accordance with an embodiment of the present invention.

FIG. 12 is a diagram illustrating an example method of analyzing and searching for configuration or state data in the network, in accordance with an embodiment of the present invention. FIG. 12 illustrates an example interface 1200, however embodiments of the present invention include any general visual representation that enables a user to analyze and search for configuration or state data in the network. State and configuration search results are interlinked and easily navigable. Related network elements are turned into links that can be clicked or followed to view details about those elements. For example, in interface 1200, a user may enter a search query in the search bar 1202. Searching for vlan 1161 at 1202 may show search results 1204 in different categories such as VLANs 1218, interfaces where those VLANs are configured 1220, text matches 1222, etc. Upon expanding an interface result, the corresponding "interface card" can be viewed at 1206 by clicking on the interface name at 1220. Following the "See sources" link 1226 in the interface card 1206 shows additional details 1208 about the configuration and state relevant to that interface with the corresponding lines of configuration and state highlighted, as shown in 1224. Similarly, it may be possible to follow links to view details about the device containing the interface, the configurations of other interfaces on that device, etc. For example, additional details 1208 may include various tabs to provide configuration data 1210, interface configuration data 1212, switchport data 1214, and/or interface status data 1216, etc. The expanded interfaces 1206 and 1208 may be presented as separate windows, panes, frames, or any other suitable layout or interface that may be linked to the search results 1204.

In another embodiment, the network analysis system may provide an interactive platform for determining a differential between the statuses of a network at different times (e.g., network "diff"). By providing an interactive platform for performing a network diff, users of the network analysis system may be able to discover and investigate differences between the configuration, state and behavior of a network across two different points in time. Network diffs enable users to validate that changes made to a network have effectuated the desired outcome, or at least have no undesired outcomes. Additionally, in some embodiments, the platform enables users to utilize network diff to audit the network for changes in a periodic fashion (e.g., once a day). Because the network diff presents changes in the network between two points of time, the interactive platform provided by the network analysis system according to various embodiments is advantageous in helping users understand and troubleshoot networking issues, including those known to have only occurred after a known point of time in the past.

The network diff, according to various embodiments, may classify and determine diffs at one or more information layers of the network architecture. Each information layer specifies one type of information that may be present at one or more devices in the network. These layers include, but are not limited to:

Topology: differences in the physical or virtual topology. Examples include added, removed, or modified devices, network links, tunnels, etc.

Configuration: differences in the running and/or saved configuration of the various devices in the network.

Interfaces: added, removed, or modified interfaces (physical or virtual) of the various devices in the network Layer-2 connectivity: changes in the layer-2 broadcast domains of various VLANs, including but not limited to added, removed, or modified devices or interfaces to broadcast domains, newly added VLANs, etc.

Figure 2:
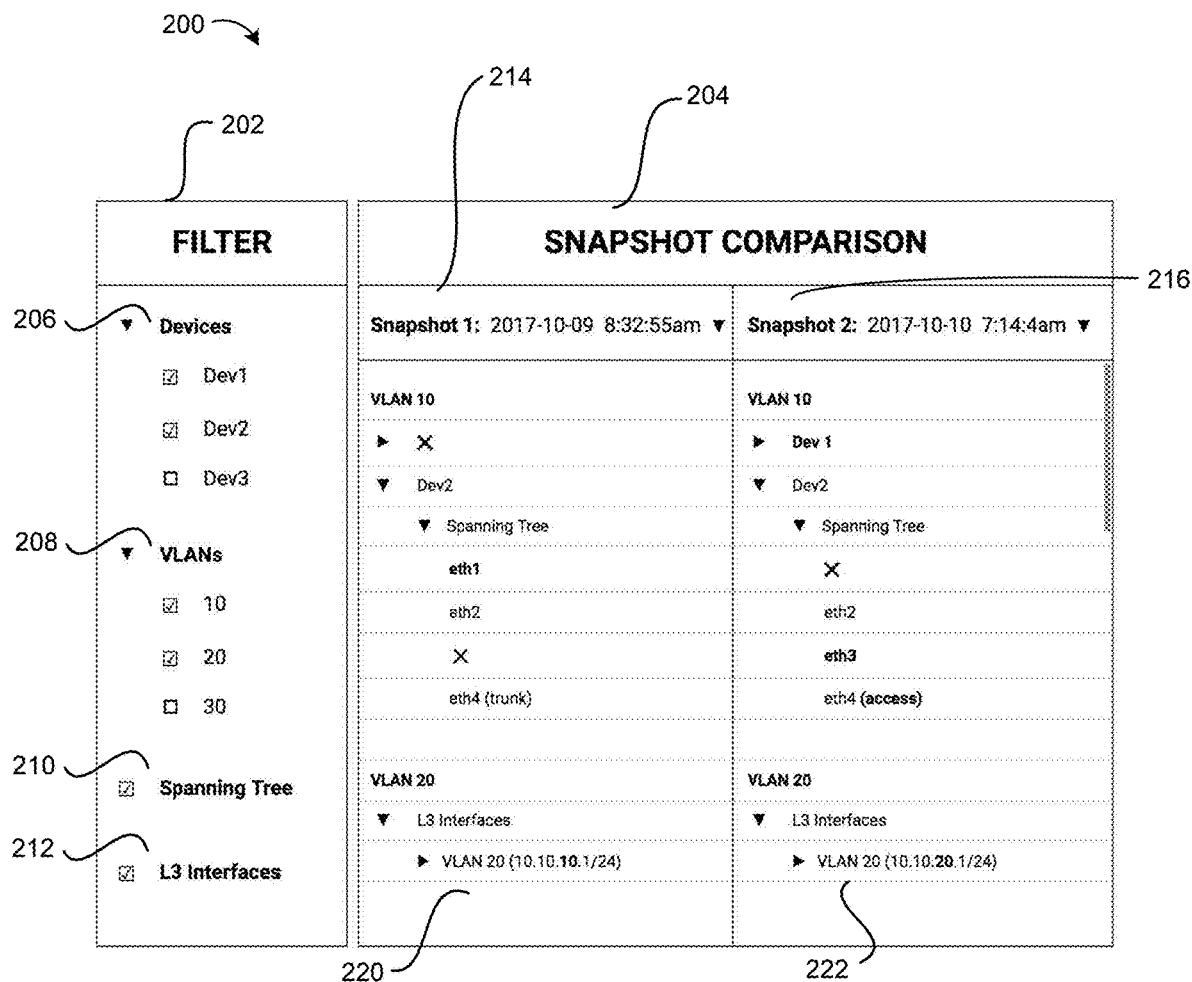
FIG. 2 illustrates an example visual representation of VLAN differences, in accordance with an embodiment of the present invention.

Layer 3 connectivity: changes in the connectivity of packets destined to various subnets. The connectivity information may include one or more of:
the set of source virtual routing and forwarding (VRF) tables where the packets originate
the destination interfaces where the packets reach
the paths that the packets take in the network
the VRFs on devices along the path Access control: changes in access control policies at various devices in the network and their effect on potential data traffic Network Address Translation (NAT): changes in how various source and destination IP addresses or Layer 4 ports of packets are changed at various devices in the network such as load balancers FIG. 2 shows an example visual representation of a VLAN diff in accordance with an embodiment, but embodiments of the present invention include any general visual representation style for showing an information-layer diff. In some embodiments, the platform provided by the network analysis system may include an interface 200 that enables the user to see the specific information-layer diff visually represented in information pane 204. The interface 200 may include a filter pane or frame 202 which filters the information shown by the information pane 204. The user may select the snapshots between which the difference must be determined, for example Snapshot 1 at 214 and Snapshot 2 at 216. These snapshots may be selected based on various means of identifying snapshots including time instances, snapshot names, tags, annotations, snapshot identifiers and other criteria. The snapshot information for Snapshot 1 may be displayed at 220 and the snapshot information for Snapshot 2 may be displayed at 222. Snapshot 1 view at 220 and Snapshot 2 view at 222 presents a side-by-side diff of the VLAN configuration and state across the snapshots. For each VLAN selected at 208, the devices (e.g., selected at 206) where the VLAN is configured may be displayed along with relevant Spanning Tree interface information (e.g., selected at 210), interfaces that are part of the spanning tree; for example, whether they are up/down, whether their mode (e.g., access/trunk) has been modified across the snapshots, etc. The L3 interfaces (e.g., selected at 212) configured in each VLAN may also be presented along with the differences in the gateway IP addresses or subnets.

The user may specify search criteria 202 for filtering the information-layer diffs. In some embodiments, this includes filters on packet headers, traffic paths, or both. Packet header filters may specify different packet header fields at any point along the path. Traffic path filters may include network devices or interfaces where the traffic originates, passes through, or ends. For example, the filter may include various devices at 206 where the user can select which devices to include. The filters 202 may also include filters by VLANs 208, spanning tree interfaces 210 or L3 interfaces 212.

Figure 3:
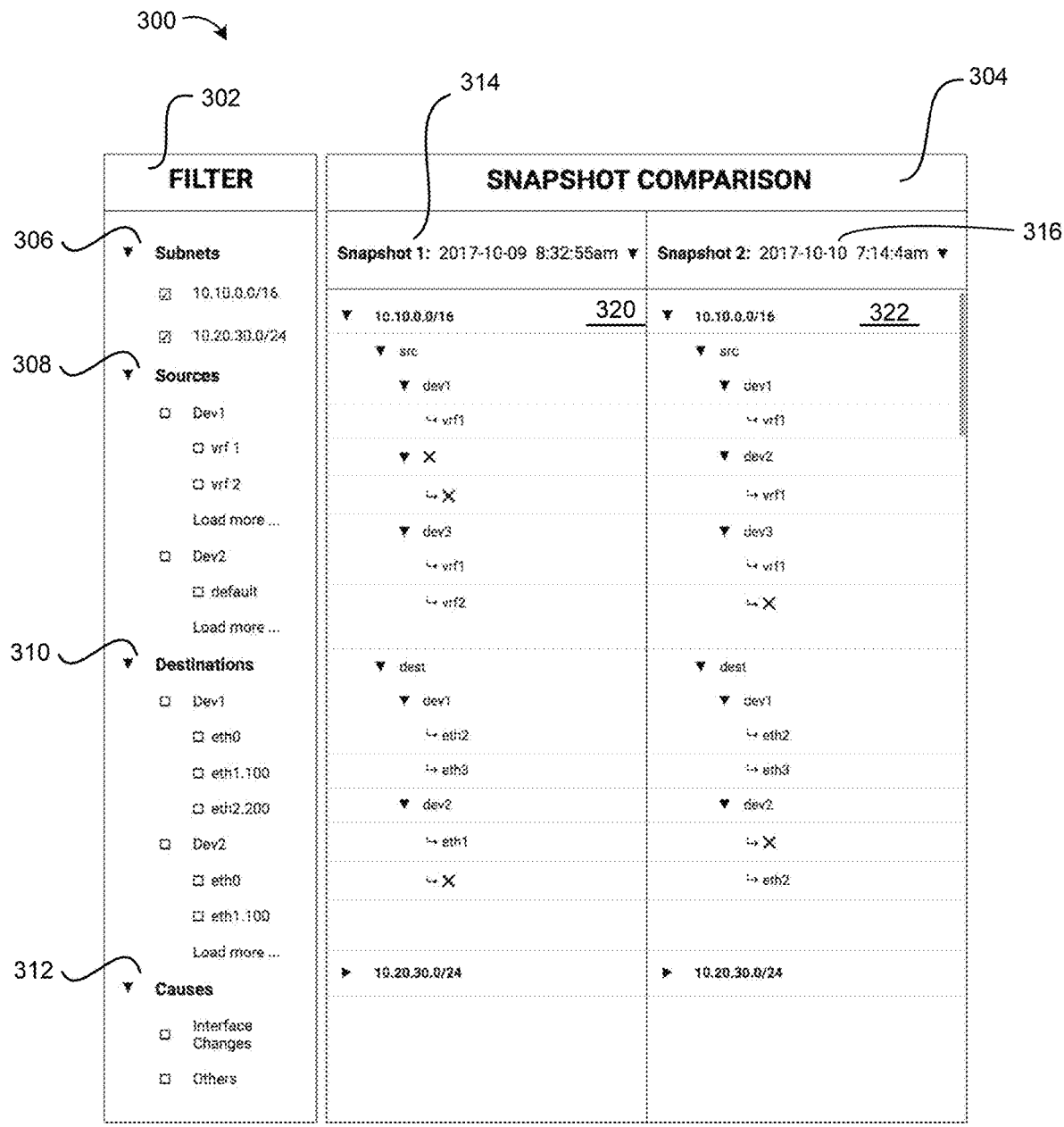
FIG. 3 illustrates an example visual representation of Layer 3 reachability, in accordance with an embodiment of the present invention.

FIG. 3 illustrates an example visual representation of Layer 3 reachability, which presents a side-by-side of the L3 reachability across the snapshots, in accordance with an embodiment of the present invention. In some embodiments, the platform provided by the network analysis system may include an interface 300 that enables the user to perform a L3 snapshot comparison 204 with user-selected criteria. The interface 300 may include a filter pane or frame 302. The user may first select the time instances or snapshots between which the difference must be determined, for example Snapshot 1 at 314 and Snapshot 2 at 316. Then the user may specify the search criteria for traffic in the filters 302. For example, the filter may include subnets 306, sources (e.g., devices, ports, etc.) 308, destinations (e.g., device, ports, etc.) 310, and potential causes 312. The user may select the time instances or snapshots between which the difference must be determined, for example Snapshot 1 at 314 and Snapshot 2 at 316. The snapshot information for Snapshot 1 may be displayed at 320 and the snapshot information for Snapshot 2 may be displayed at 322. For each subnet selected at 306, the interface 300 may present a list of source VRFs on one or more devices at 320 that have full connectivity to each of the corresponding set of destination interfaces in 320. The source VRFs (e.g., selected at 308) or destination interfaces (e.g., selected at 310) between which reachability has changed may also be highlighted in the views of the snapshots; for example, at 314 for Snapshot 1 and at 316 for Snapshot 2.

In some embodiments, the network diffs may be filtered by various criteria, such as the devices on which the diffs are observed, any VLANs or the IP addresses associated with the diff, etc. Furthermore, the platform according to various embodiments may display various characteristics of the traffic that may be affected by a network diff, such as packet headers or traffic paths. The platform may provide a means to query for traffic that that is affected by the diff and display the differences in how the traffic is handled by the network (e.g., traffic diff). To enable a user to query for traffic, the platform may provide a text box, selection menu, or any other suitable interface.

In some embodiments, the network diffs may be cross-correlated, and the causality relationship between various information-layer-specific diffs may be computed and presented to the user on the platform provided by the network analysis system. For example, the network analysis system may show that an L3 connectivity diff is caused by an interface failure, which in turn is caused by a configuration change. In another example, the network analysis system may show that an L3 connectivity diff is caused by a change to the BGP protocol.

In another embodiment, the network analysis system may provide an interactive platform for determining a differential between various traffic paths or flows in the network (e.g., "traffic diff"). The evolution of network configuration and state over time may lead to packets being treated differently over time. As such, the ability to quickly and easily understand differences in packet handling over time may help a network administrator to resolve a problem quickly. By being able to easily track down the specific time or specific change at which an error first manifested, the user (e.g., network administrator or manager) may be able to successfully diagnose and address the problem. Embodiments of the present application provide an interactive platform to display traffic changes in a visual manner so that it is easier and more intuitive for the user to analyze, investigate, and navigate through the traffic differences.

Figure 9:
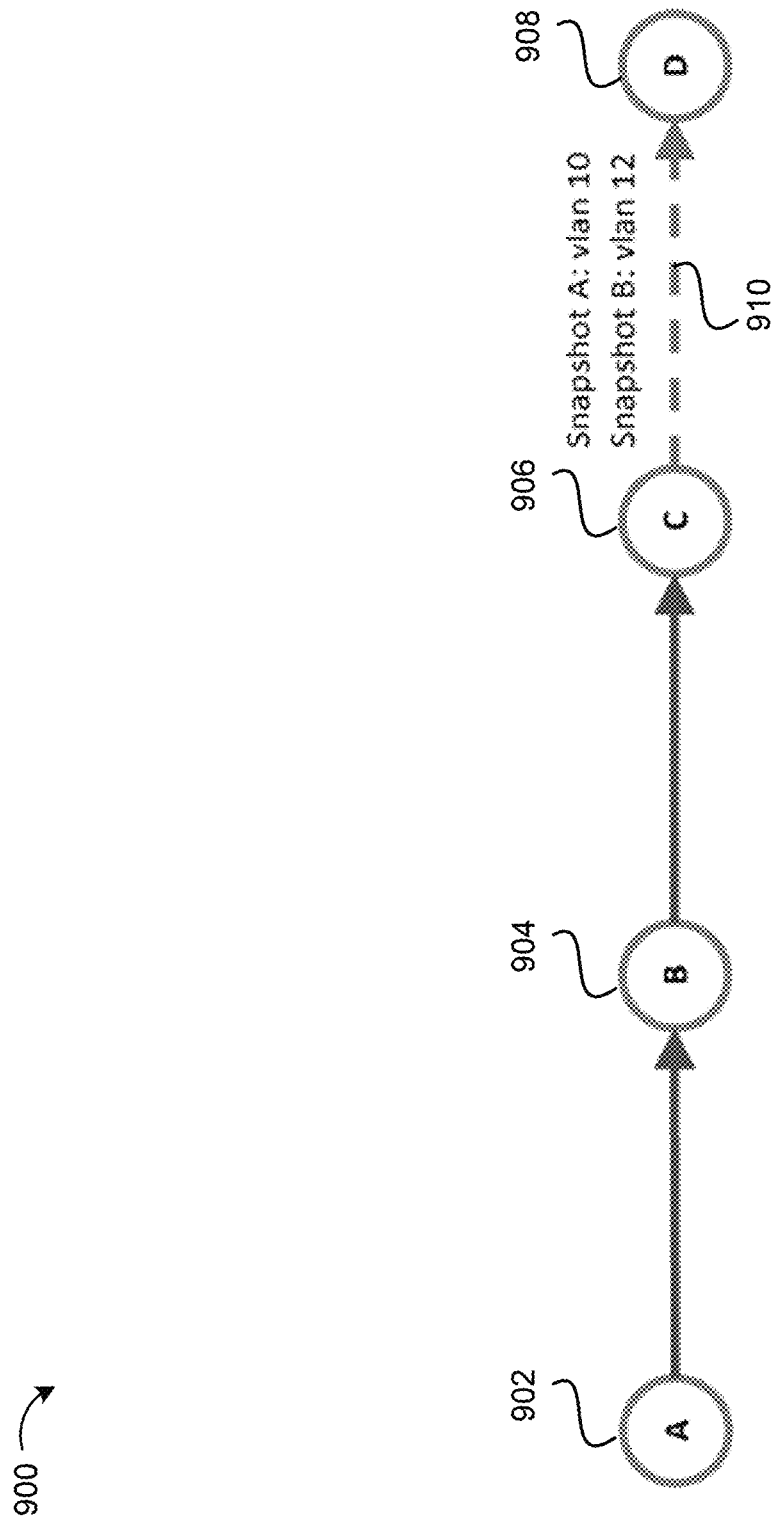
FIG. 9 is diagram illustrating an example method of analyzing a traffic path that is the same between two snapshots, in accordance with an embodiment of the present invention.

The platform provided by the network analysis system according to various embodiments may enable a user to query for differences in the way a network handles packets over time. Because the network traffic path or flow path results are displayed visually on the platform, the focus is shifted to illuminate specific examples of network traffic, rather than whole-network behavior, which can be overwhelming. FIG. 9 is a diagram illustrating an example method of analyzing traffic paths that traverse the same devices between two snapshots, in accordance with an embodiment of the present invention. In example traffic flow 900 of FIG. 9, the traffic path from node A 902 to node B 904 to node C 906 may be the same between Snapshot A and Snapshot B. However, traffic path ABC may result in different headers, depending upon the particular snapshot, as the traffic flow follows network path 910 to node D 908. For example, in Snapshot A, from node C 906 to node D 908 via path 910, the header values of the packet may include "vlan 10." In Snapshot B, from node C 906 to node D 908 via path 910, the header values of the packet may include "vlan 12." The platform identifies the common and differing portions of these paths corresponding to the same input traffic, as well as highlights the differences visually, in the interactive interface.

Figure 10:
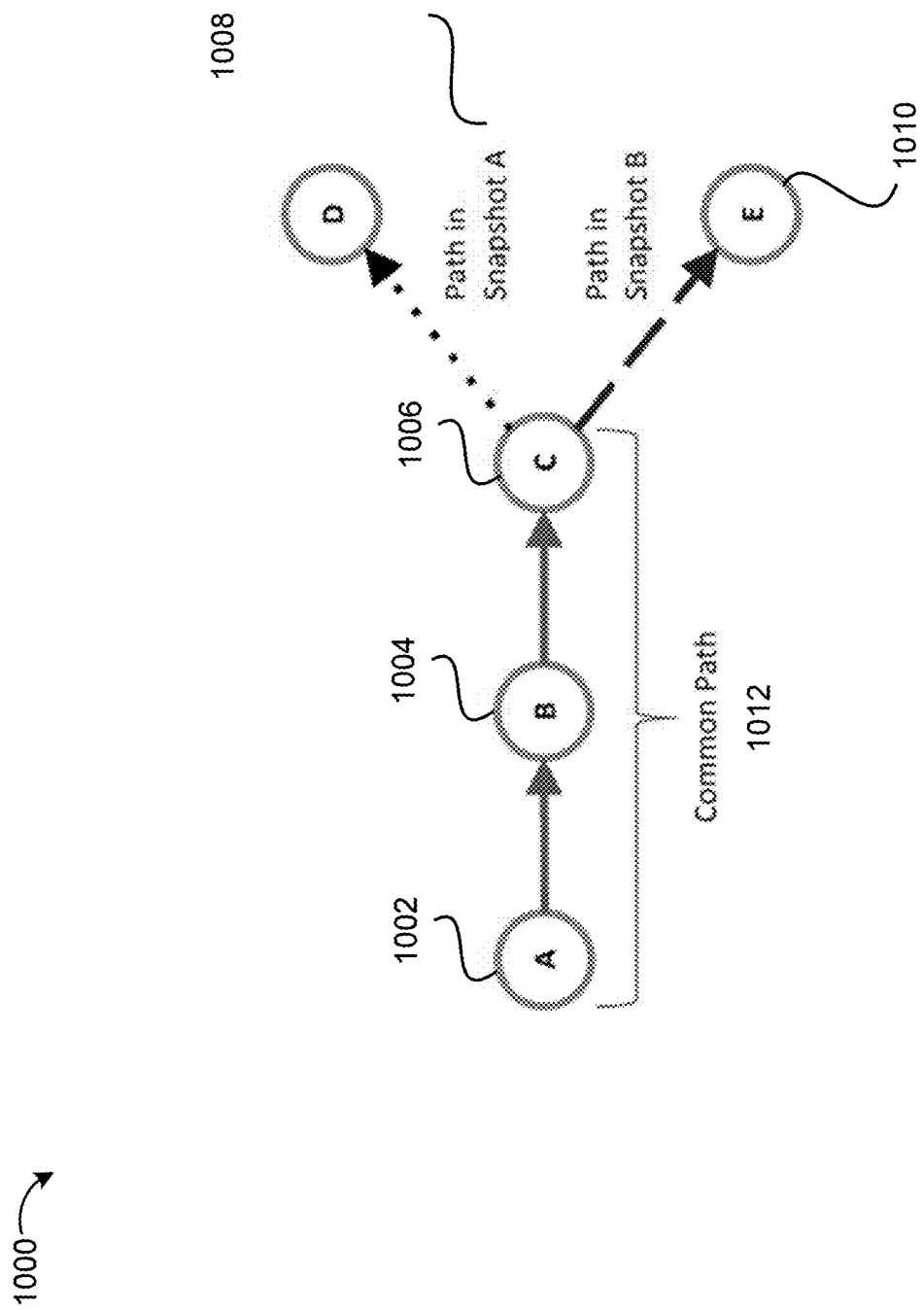
FIG. 10 is diagram illustrating an example method of analyzing a traffic path that is different between two snapshots, in accordance with an embodiment of the present invention.

FIG. 10 is a diagram illustrating an example method of analyzing a traffic path that traverses different devices between two snapshots, in accordance with an embodiment of the present invention. In example traffic flow 1000 of FIG. 10, a traffic path from node A 1002 to node B 1004 to node C 1006 may have a common path 1012 ABC, but then differ between two snapshots after node C 1006. For example, in Snapshot A, the packet traverses from node C 1006 to node D 1008, while in Snapshot B, the packet traverses from node C 1006 to ode E 1010. Between Snapshot A and Snapshot B, the traffic after node C 1006 has taken different paths, but each path from each snapshot shares a common path 1012.

According to various embodiments, a query may consider the difference in traffic handling between two different points of time $T_A$ and $T_B$ in a network. In one embodiment, these instances of time may be selected in the form of snapshots. In another embodiment, these instances of time may be associated with the closest available state from network devices. In various examples, network state collection selections at time $T_A$ and $T_B$ in a network may be referred to as Snapshot A and Snapshot B.

In some embodiments, the platform provided by the network analysis system may include a search interface that enables the user to search for traffic matching specific criteria. The user may first select the time instances or snapshots between which the difference must be determined. Then the user may specify various search criteria for traffic. For example, specifying various search criteria may be implemented using filters on packet headers, traffic paths, or both. Packet header filters may specify different packet header fields at any point along the path. Traffic path filters may include network devices or interfaces where the traffic originates, passes through, or ends.

Figure 13:
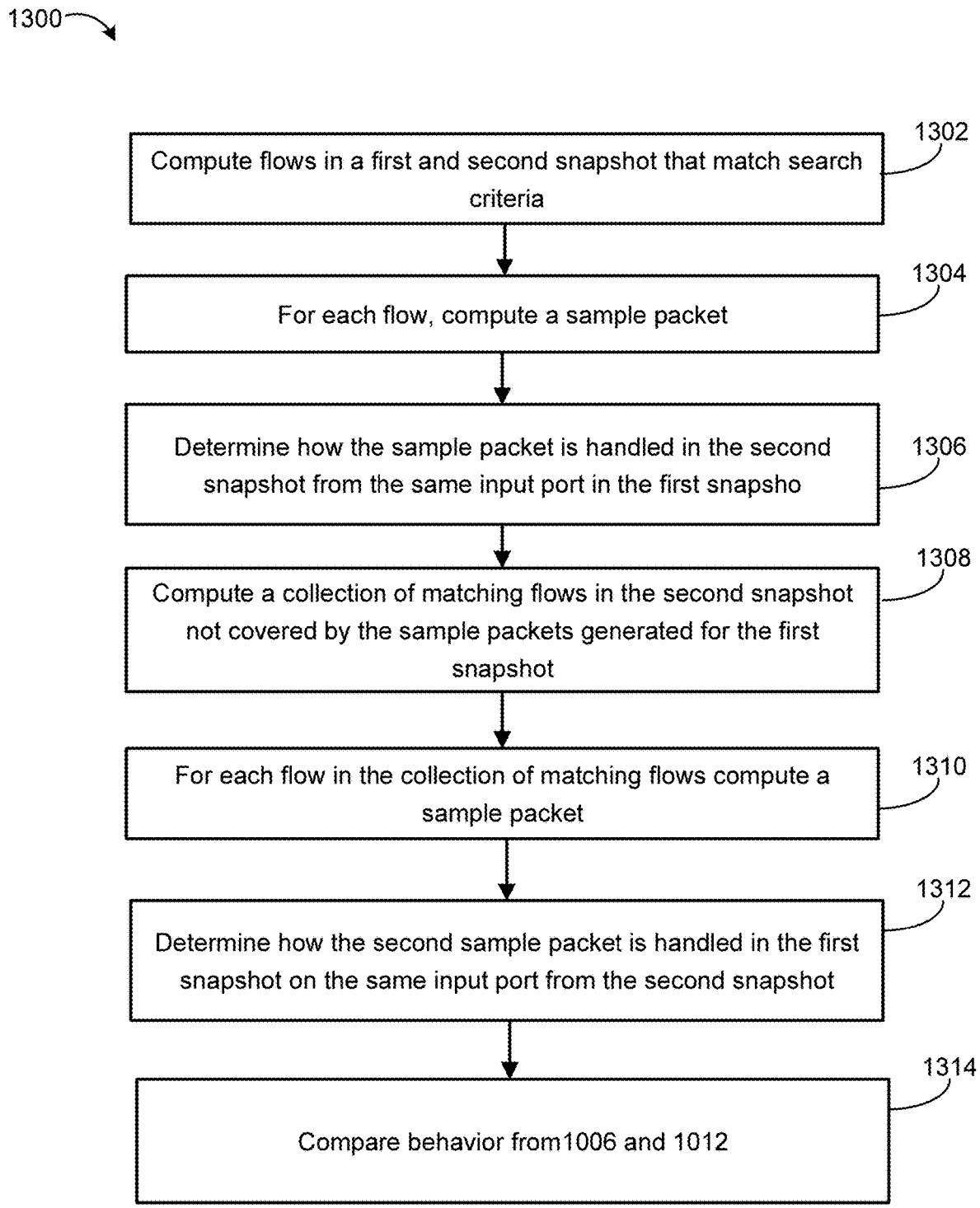
FIG. 13 is a flow diagram illustrating an example method of network analysis, in accordance with an embodiment of the present invention.

FIG. 13 is a flow diagram illustrating an example method of network analysis, in accordance with an embodiment of the present invention. To compute traffic diffs, the network analysis system may take the following steps illustrated in FIG. 13. At 1302, the network analysis system may compute flows in various snapshots, for example Snapshot A and Snapshot B that match the search criteria selected by the user. In this example, the flows of Snapshot A that match the search criteria may be referred to as HitsA and flows of Snapshot B that match the search criteria may be referred to as HitsB.

At 1304, for each flow in HitsA, a sample packet may be computed. In some embodiments, the sample packet may have some fields that are unspecified or wildcarded (e.g., L4 ports). If a sample packet has a wildcarded field, such as IP options, then the network handles the packets in the same way regardless of the value of that wildcarded field.

At 1306, the network analysis system may determine how the sample packets from step 1304 on the same input port from Snapshot A are handled in Snapshot B. However, a traffic flow corresponding to a packet traced in Snapshot B may not be present in HitsB if it does not match the search criteria. For example, the search criteria may specify that packets should end at a particular device, but in Snapshot B, the sample packet chosen in Snapshot A may be handled by the network to end at a different device. While performing step 1306, the network analysis system may keep track of the flows in HitsB that are being covered by these sample packets. That is, the system may determine and note that the sample packet from Snapshot A has a corresponding sample packet with a matching flow in HitsB.

At 1308, the network analysis system may compute the collection of flows in HitsB that were not covered by the sample packets generated for flows in HitsA. These flows hereby called not-covered flows are flows in Snapshot B that match the search criteria selected by the user, but may not have been compared to any corresponding behavior in Snapshot A yet.

At 1310, for each flow in the not-covered flows determined in step 1308, another sample packet may be computed.

At 1312, the traffic flows of the sample packets from step 1310 may be determined. Specifically, the network analysis system may determine how the sample packets on the same input port from Snapshot B are handled in Snapshot A.

At 1314, the behaviors of the sample packets between Snapshot A and Snapshot B may be compared. Both behaviors may be displayed to the user on the interactive platform for easy comparison, analysis, and diagnosis. The network analysis system may determine the diff using these sample packets for which the behavior has been determined in both snapshots.

According to various embodiments, the network analysis system may indicate that there is a difference in the handling of that sample packet in any of the following scenarios. The first scenario is when the sample packet takes a different path in Snapshot B compared to Snapshot A. The second scenario is when the sample packet undergoes different header transformations in Snapshot B compared to Snapshot A. For example, the egress VLAN for the packet may be changed from 10 in Snapshot A to 20 in Snapshot B. The third scenario is when the sample packet undergoes different behavior at one or more hops even though it goes through the same hops and has the same packet transformations. For example, the packet may have some ACL rules applied to it in Snapshot B that were not applied in Snapshot A. As another example, the packet may be forwarded by a default IP rule in Snapshot A but forwarded by an explicit IP rule in Snapshot B.

However, if the above scenarios are absent, there is no difference in handling of that sample packet between Snapshot A and Snapshot B. The platform according to various embodiments may indicate how that packet is handled and that there is no difference in behavior. If the packet may take multiple paths in one or more snapshots, then the set of paths in Snapshot B are compared with the paths in Snapshot A to match up paths that go through the same devices and have the same behaviors. If path A in Snapshot A and path B in Snapshot B go through the exact same sequence of devices and interfaces, and undergo the same header transformations at the devices, then the two paths may be matched together and treated as identical. Otherwise, paths are matched together based on a score of commonality meeting or exceeding a threshold value.

In some embodiments, the score of commonality is a value that is computed for a pair of paths. The score may be higher if the paths share a common device hop, and if the paths share common packet header values as the packet enters or leaves that device. The commonality score may then be used to match and compare paths that have changed from Snapshot A to Snapshot B.

According to various embodiments, the platform provided by the network analysis system may also provide automatic root-cause diagnosis. The root-cause may include both location and reasons for the identification of the root-causes as part of the network analysis system's diagnosis. The network analysis system may automatically determine potential root causes of observed, unintended traffic behavior, and through the platform, provide heuristics to rank the root-causes in order of likelihood. For example, the resulting potential root-causes may be displayed in the platform for the user from most likely to least likely. Ranking the root-causes saves the user time by placing root-causes that have higher likelihood at the top for immediate attention. Additionally, ranking by a probability of accuracy may also reduce inefficiency and human-error in implementing a planned resolution, determined as a result of an analysis, into action.

In some embodiments, the network analysis system may compute and store packets that experience a specific behavior in the network; for example, including the path that the traffic takes, and the specific configuration and state at each device along the path responsible for causing the traffic to take the path. In other embodiments, the network analysis system, through the interactive platform, may enable the user to define checks on expected and prohibited traffic behaviors in the network. For example, a check may specify that traffic with IP destination 100.100.100.0/24 should be able to go from deviceA to deviceB. This is called an existence check. In another example, a check may specify that no SSH traffic should be able to enter Internet-facing ports of a network and reach any of the internal servers. This is called an isolation check.

If a check fails, the network analysis system, according to various embodiments, may automatically extract traffic paths that act as representative examples demonstrating the check failure. For example, if an isolation policy that expects traffic to be prohibited from flowing between two locations in the network fails, a traffic path that shows traffic flowing between those two locations may act as a representative example of the policy failure. Similarly, if an existence policy that expects traffic to flow between two network locations fails, a traffic path that shows the traffic getting dropped before reaching the intended destination or a traffic path that shows the traffic reaching a different destination may act as a representative example of the policy failure.

However, even with a representative example, the exact root cause of an observed behavior that is contrary to the high-level expectation may not be obvious, especially when the low-level intent of how the network architect wanted that traffic to be handled is not present. For example, the root cause of an isolation policy failure could be that a firewall rule was too permissive or that an ACL was not correctly set up at any of the devices along the path. Similarly, the root cause of an existence policy failure could be that the traffic was directed to a different location, the traffic was dropped by an ACL rule that was too restrictive, or the traffic was dropped at an interface because a certain VLAN was not configured on it.

According to various embodiments, the network analysis system may break down the automatic root cause diagnosis into two parts: potential root cause identification and automatic root cause identification. In identifying the potential root cause, the network analysis system may link the observed behaviors (e.g., representative example traffic behavior) to an ordered list of potential candidate root causes in decreasing likelihood (e.g., most likely to least likely). In one embodiment, the network analysis system may determine the network's behavior along a path in terms of commonly understood network functions such as IP routing, ARP resolution, MAC forwarding, access control, network address translation, etc. Based on the type of check failure, the network analysis system then automatically extracts the network functions corresponding to an appropriate functional layer at each device along the traffic path as the potential root causes.

For example, if an isolation check fails, the Access Control network functions at each device along the path may be extracted as potential root causes, as the traffic should have likely been dropped by the access control function at one of the devices along the path. As another example, if a reachability check fails, the network analysis system may first check if the corresponding representative traffic path is dropped along the path. If so, the network analysis system picks the network function responsible for dropping the traffic as the candidate root cause. The candidate root cause could be an overly restrictive access control network function or an input network function that does not accept the VLAN tag with which the traffic enters. As another example, if the representative traffic path shows traffic being redirected to a different location, the network analysis system may identify the devices where the traffic path deviates from the path to the intended destination and extract the network function responsible for steering the traffic off course as the potential root cause.

If the network analysis system discovers multiple potential root causes, the network analysis system according to various embodiments may rank the multiple potential root causes based on their likelihood to be the actual root cause. For example, if there are multiple access control network functions at various devices along the path appearing as potential root causes for an isolation check failure, the access control network function in the device with the maximum number of access control rules may be ranked the highest as it contains the maximum amount of security related policies.

In another example, the network analysis system may use historical data to rank potential root causes. The network analysis system periodically collects state and configuration information (called a snapshot) from the network devices and runs the checks each time. Upon a check failure, the network analysis system may rank potential root causes higher when there is a corresponding configuration/state that has changed compared to the last time the check passed.

In automatic root cause determination, the network analysis system, according to various embodiments, may incorporate a check history and/or configuration/feature diffs in determining which candidate root cause(s) may be most likely to have caused the check failure. In one embodiment, the network analysis system may automatically revert the configuration changes corresponding to the candidate root causes, and re-run the checks. In other embodiments, the network analysis system may recompute the model to test the reverted changes. If reverting a particular change causes the check to pass again, the network analysis system may record or mark that change as the most likely root cause of check failure.

According to various embodiments, the network analysis system may identify check failures leading to diagnosis, and may display the check failures on the interactive platform to the user. The interactive platform enables a user to navigate from a view that displays policy check failures to view(s) that enable diagnosis of why the check failed. As a result, the interactive platform saves the user time in diagnosing based on check failures, and more importantly, the context of a policy check failure is available to the user, which may provide the explanation of why the check failed. Without the network analysis system identifying check failures leading to diagnosis, a user may not know how to formulate a query to debug a particular policy check failure. Even if users know how to formulate such queries, this manual technique is susceptible to error and misleading results.

In another embodiment, if the failing network check requires the isolation of two network elements or the absence of traffic matching certain criteria, the check may fail due to the presence of such traffic, either observed (if using flow measurements), or potentially traversing the network (if using a model). In this case, the network analysis system may provide for display traffic that violates the check (i.e., traffic that may or may not exist, but should never exist). The traffic may be displayed to a user on an interactive platform provided by the network analysis system. In one embodiment, the network analysis system may provide an understandable explanation of traffic behavior along matching paths.

Additionally, if the failing network check requires the existence of traffic matching certain criteria, the network analysis system provide for display the filter criteria for such traffic. The traffic may be displayed to a user on an interactive platform provided by the network analysis system. As such, the platform provides the ability to modify individual filters. By turning the filters on and off, and immediately seeing their effect on traffic, the user may intuitively diagnose how the network handles the traffic of interest of the check.

To illustrate, consider the following check as an example:
Traffic should exist in the network that matches the following criteria
- From device A
  - With IP destination 10.10.10.10
  - With VLAN 20
- Through device B
- To device C In this example, when the check above fails, the user may turn off the "To device C" filter to see if the traffic is able to reach the waypoint B. The user may alternatively turn off the "Through device B" filter to see if traffic reaches the intended destination, but bypasses the provided waypoint B. In some embodiments, this system may be further enhanced to allow the user to easily edit the filter criteria and add new ones rather than just enable or disable existing search criteria in the check.

In another embodiment, if the failing network check may be for a predefined check such as VLAN consistency across a topology link, the network analysis system may identify and provide for display on the platform any VLAN inconsistencies to the user. The network analysis system also provides links to necessary configuration and state on the devices that provide details on the inconsistency.

According to various embodiments, the network analysis system may also determine checks for network analysis. Simple configuration mistakes often lead to major network outages. Any "well configured" network should satisfy certain configuration and behavioral properties for it to function correctly. In some embodiments, the network analysis system may support "predefined checks" that generally apply to networks, covering low-level link configuration properties, up to higher-level traffic routing properties that apply to many paths. These properties may apply to many networks, and may not be specific to the particular set of applications running there. The information to decide whether a check passes (e.g., indicating a property is valid throughout the network) or whether a check fails (e.g., indicating at least one example where it is not satisfied) may come from device configuration, device state, and user inputs. Predefined checks may apply automatically to a network as it changes.

Predefined checks for various configuration and behavioral invariants in the network may include the following:
- VLAN Consistency: Every pair of interfaces, A and B, should have VLANs defined in a consistent way. If VLANs are not consistently defined, traffic may get dropped implicitly within the network in some cases, and traverse across VLAN boundaries in other cases, leading to security problems. The criteria for consistent VLAN definition may include (but are not limited to):
  - If both A and B are access interfaces, their access VLANs should be equal.
  - If both A and B are trunk interfaces, the trunk VLAN sets and the native VLANs on both should be equal.
  - If A or B is an access interface, the other should not carry any VLANs (i.e., be a trunk interface or have sub-interfaces).
  - If A or B carries any VLANs (either as a trunk interface or via sub-interfaces), the other should also carry the same VLANs.
- IP Address Uniqueness: IP addresses assigned to device interfaces should be unique across each VRF in the network.
- MTU Consistency: Interfaces at both ends of each link should have the same maximum transmission unit (MTU).
- Duplex Consistency: Interfaces at both ends of each link should have the same duplex type configured.
- Link Speed Consistency: Interfaces at both ends of each link should have the same link speed.
- Port Channel Consistency: All configured port channel (LAG) interfaces should successfully join the port channel.
- No Forwarding Loops: There should be no traffic forwarding loops in the network. A packet is said to go through a forwarding loop if it ingresses an interface on a device more than once as it traverses a path. In some cases, the packet going through a forwarding loop may go through a set of devices an infinite number of times.
- No Traffic Blackhole: No traffic should be implicitly dropped (due to not matching any rule) in the network.
- Deterministic BGP Configuration: BGP should be configured to converge deterministically to a single state.

In some embodiments, predefined checks may include zero or more parameters. Examples of parameterized predefined checks include, but are not limited to:
- Shortest paths: This check allows the user to define two or more groups of devices and verifies that every potential path that traffic may take between any two devices that belong to different groups goes over the shortest path as determined by the topology of the network.
- VLAN Existence: Verifies that edge trunk interfaces must carry all specified VLANs. Takes the specified VLANs as an input parameter.
- Trunk Interface Whitelist: Only whitelisted interfaces may be in trunk mode.

The network analysis system may implement the predefined checks such as those described above in three steps. First, the network analysis system collects information about the network elements including, but not limited to:
- The devices (e.g., switches, routers, firewalls, load balancers) in the network
- The interfaces present on each network device
- The VLANs, IP addresses, MAC addresses, port channel, MTU, duplexity, configured on each interface above
- The links connecting the various devices in the network, either automatically via LLDP or CDP, or manually added by the user
- BGP configuration on each device of the network Subsequently, the network analysis system may transform the above vendor-dependent information into a vendor-independent model of the network. Finally, the logic for each predefined check may be run on the network model.

In one embodiment, if a predefined check fails, the network analysis system may provide information that caused the check failure. For example, if the MTU consistency check fails, the network analysis system shows (1) the network links where interface MTUs are different, (2) the MTU values of the interfaces interconnected by that link, and/or (3) the specific lines of collected configuration and state for those interfaces that show the MTU values.

According to various embodiments, the network analysis system may also perform a state collection from resource-limited devices. Comprehensive analysis of traffic through the network requires collecting the current configuration and forwarding state from some or all of the devices in the network. Examples of collected state may include, but is not limited to, interface configuration, VLAN configuration, IP FIB (Forwarding Information Base), BGP RIB (Routing Information Base), ACL configuration, etc. This information may be collected using various mechanisms such as by issuing CLI commands within a terminal session, via SNMP, or via other standard or proprietary protocols and APIs such as NetConf, OpenFlow, Arista eAPI, etc. Some of these states may be very large, e.g. the IP FIB of an Internet-facing border router of a network that contains routes to all the IP addresses on the Internet.

When the amount of state to collect is large, and/or when the target device is slow, the collection process may trigger false alarms. These alarms occur when exporting large amounts of state puts a sustained burden on the device CPU, causing it to be constantly operating at high utilization levels. The high CPU usage causes CPU utilization alarms to trigger, which are typically set up to detect anomalous conditions for routing processes. Such alarms waste the time of network operations engineers and provide a false sense that the collection process is putting the network device at risk. However, embodiments of the present application provide a safe mechanism to collect large amounts of device state without triggering CPU alarms.

In one embodiment, large IP-based state such as IP FIB, BGP RIB, or MPLS RIB is collected in chunks. The network analysis system may first divide the space of all possible IP addresses into multiple chunks or subnets of equal or unequal sizes. For example, the space of all possible IP addresses may be divided into 4 equal sized chunks as follows: 0.0.0.0/2, 64.0.0.0/2, 128.0.0.0/2, and 192.0.0.0/2. The network analysis system then collects the routes corresponding to those subnets, one at a time. While doing the collection, the network analysis system may leave a sufficient gap between successive collections such that the average CPU utilization over a pre-configured window of time does not exceed a pre-defined threshold.

In another embodiment, one or more of the number of chunks, the size of the chunks, the CPU utilization time window, the CPU utilization alarm threshold may be configured or automatically determined by the network analysis system. Additionally, the network analysis system may periodically monitor the CPU utilization of the device from which the state is to be collected using one or more methods such as SNMP, CLI commands, etc. Based on the CPU utilization value, the network analysis system may determine when to make the next collection and the size of the chunk of the next collection such that the average CPU utilization does not exceed the alarm threshold.

Figure 14:
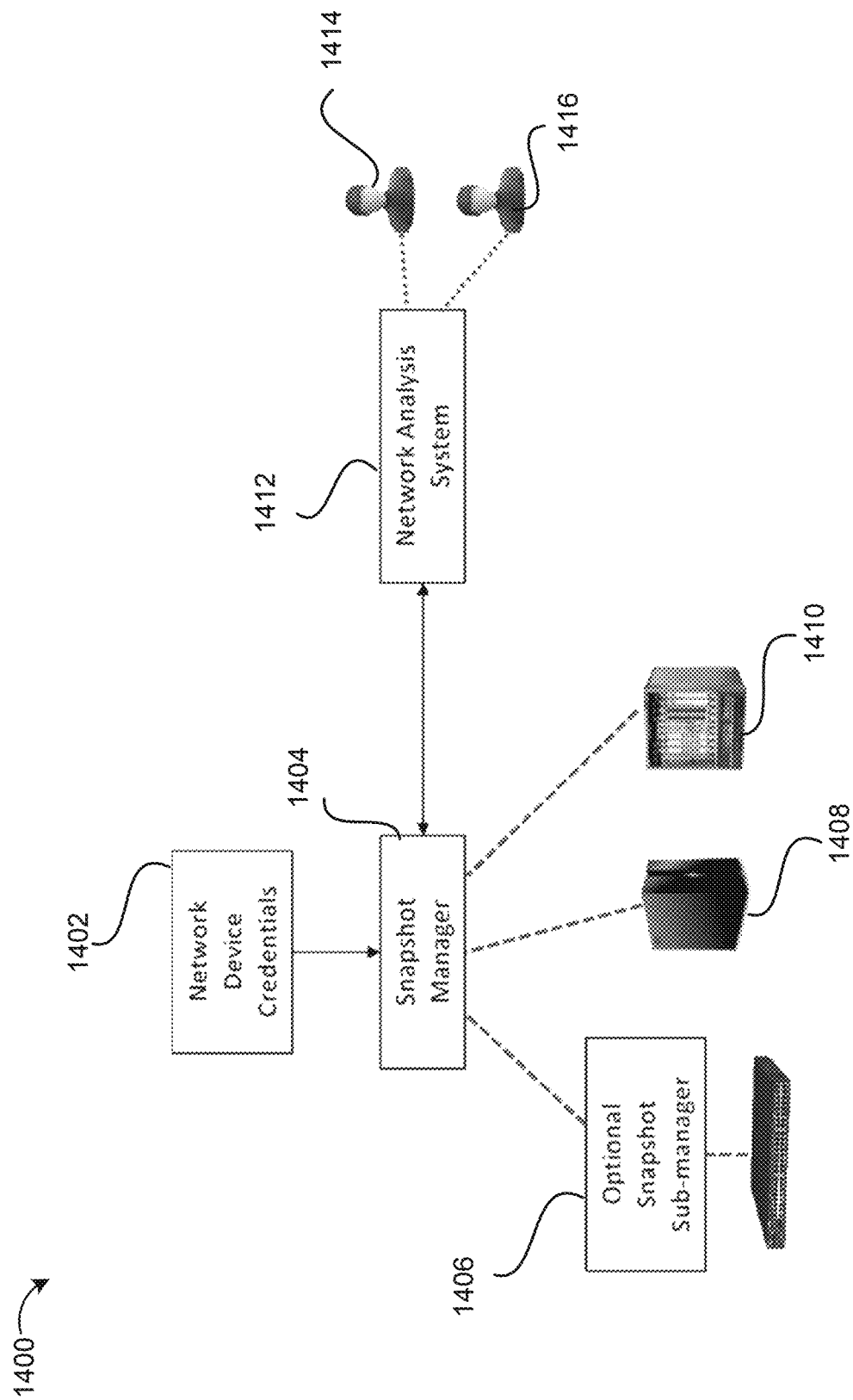
FIG. 14 is diagram illustrating an example network snapshot manager of a network analysis system, in accordance with an embodiment of the present invention.

According to various embodiments, the network analysis system may also provide a remotely triggered snapshot collection. FIG. 14 is a diagram illustrating an example system 1400 including a network snapshot manager 1404 remote from a network analysis system 1412, in accordance with an embodiment of the present invention. The network analysis system 1412 may be operated by one or more users 1414 and 1416 (e.g., network administrator or manager) and may trigger the collection of network data, including configuration and state, via a remote connection into a network data management service. As such, the network analysis system 1412 enables collection from anywhere, enables safe access to the devices by preventing concurrent access, and provides an ability for others to remotely assist with network troubleshooting. In this embodiment, the network analysis system 1412 may be separate from the snapshot collection system 1404. A snapshot may be formed from requests to devices 1408 and 1410, while in others, the devices themselves may push data to the snapshot manager 1404 or optional snapshot sub-manager 1406, whether via complete state snapshots or in parts. The data collection does need to be precisely synchronized in time.

Various embodiments may orchestrate snapshot collection from network devices, as opposed to only supporting independent, uncoordinated collection, which may enable the data collection process to respect resource constraints and avoid sending conflicting requests to devices. A logically centralized snapshot collection manager 1404 may be configured with the devices 1408 and 1410 from which snapshots must be collected. These devices may belong to one or more networks, may be located in different places, and may be virtual devices. The devices may be configured with credentials for access, either via individual credentials or common credentials for several devices, in network device credential 1402. Further, the devices 1408 and 1410 may be of different types—e.g. routers, switches, firewalls etc. and the same or different means of communication may be used to collect the snapshot from these devices. According to some embodiments, the devices 1408 and 1410 may require further specialized configuration such as a connection timeout, alternate credentials, tunnels to reach individual devices, etc.

The logically centralized snapshot collection system may support one or more means of triggering snapshot collection. In some embodiments, this may include a service that supports remote procedure calls (RPCs) and/or web requests that indicate that a new snapshot collection must be triggered. In some embodiments, the specific methods used to connect to individual devices may be pre-configured by a human user or alternate systems that provide this information. In other embodiments, the connection methods may be provided to the snapshot collection system every time a collection must be performed. In other instances, this information may be automatically detected by the snapshot collection system. The logically centralized snapshot collection manager may collect the snapshot directly from the devices or use the help of one or more agents and delegate the collection task to them (e.g., optional snapshot sub-manager 1406). These agents may in turn delegate this task to other agents with the eventual goal of collecting the snapshot from all devices.

Individual collection agents (e.g., optional snapshot sub-manager 1406) may only have access to a subset of devices from which snapshots must be collected and would only be responsible for collecting snapshots from those devices. In some embodiments, these collection agents may maintain a persistent connection to the logically centralized snapshot collection manager. In other instances, there may be periodic communication between the agents and the centralized collection manager to exchange information about active tasks. The connection between the collection agent and the snapshot collection manager 1404 may be initiated by the agents 1406 or by the collection manager.

The snapshot collection manager 1404 may further support collection from a subset of configured devices or only collect a subset of configuration and state information from the devices that comprise a snapshot. For example, state that is changed frequently may be collected more frequently while state that changes less frequently may be collected at a different frequency. In some embodiments, the snapshot collection manager 1404 may support the ability to periodically collect snapshots from pre-configured devices. These may be complete snapshots, or snapshots of different devices taken at different frequencies, or different commands or kinds of state on the devices taken at different frequencies. For example, state that changes less frequently may be collected less frequently while other state may be collected more frequently.

In some embodiments, the snapshot collection manager may orchestrate different snapshot collection requests to avoid executing many concurrent commands on any individual device. The collection manager 1404 may also avoid collecting the same command outputs from a device if the same request is received multiple times in a short span of time. For example, if a snapshot collection request for device A is received and while that is being executed, if another request is received for the same device, the snapshot collection manager may simply not collect the Snapshot Again and reuse the outputs it just collected for that device.

Figure 15:
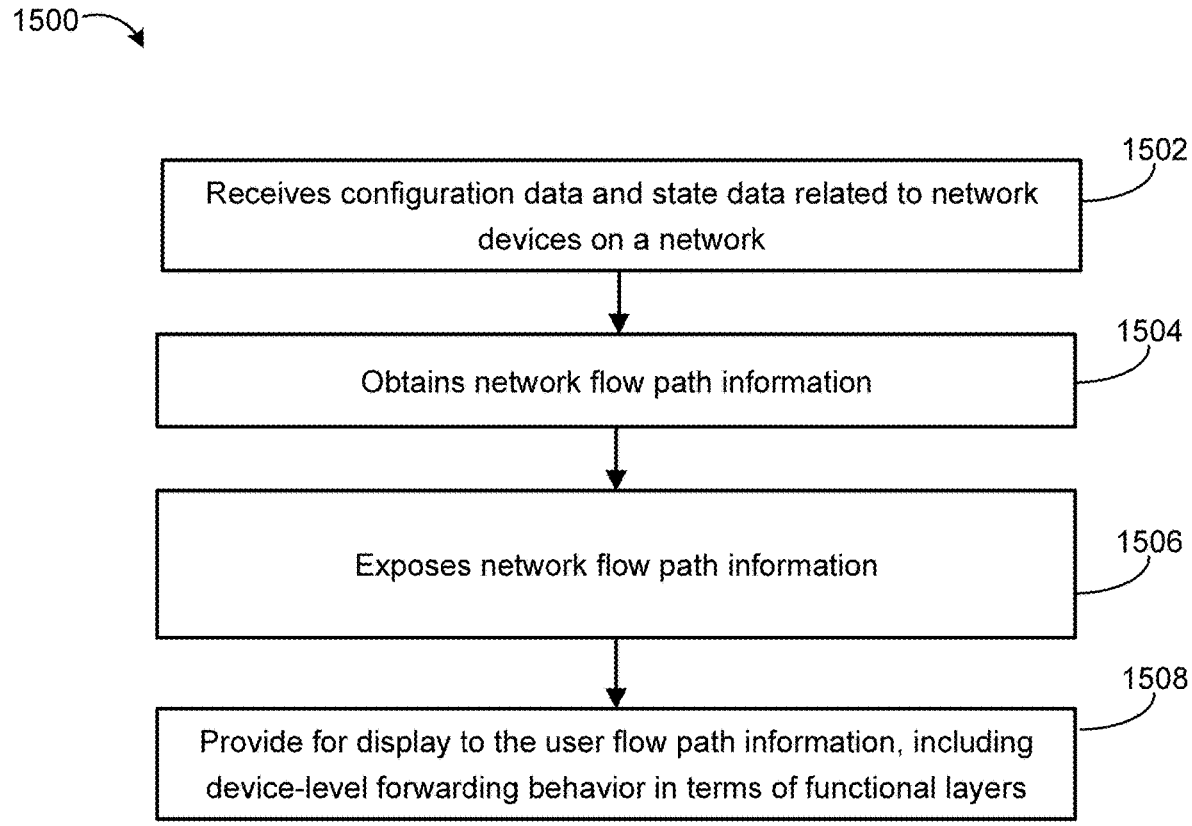
FIG. 15 is a flow diagram illustrating an example method of network analysis, in accordance with an embodiment of the present invention.

FIG. 15 is a flow diagram illustrating a high-level example method of network analysis, in accordance with an embodiment of the present invention. Embodiments of the present application provide improved network analysis techniques via an interactive and intuitive platform to the user. The high-level flow 1500 in FIG. 15 may include at 1502 that the network analysis system receives configuration data and state data related to network devices on a network. As discussed above, configuration and state data may be collected remotely, automatically, periodically, and/or specified by the user using filters on the platform provided by the network analysis system.

At 1504, the network analysis system may obtain network flow path information. The network flow path information may be based on the configuration and state data collected, or may be obtained through the network analysis tool by the techniques described herein. For example, through the platform of the network analysis tool, the user may be able to navigate through traffic paths for troubleshooting and diagnosis, such as identify redundant paths, loops, blackholed paths, etc.

At 1506, the network flow path information may be exposed on the platform, as illustrated in example interfaces of FIGS. 2-5. For example, by exposing the network flow paths, the user may be enabled to search and filter through the network flow paths.

At 1508, the network analysis system may provide for display on the platform flow path information, including device-level forwarding behaviors in terms of functional layers, as illustrated in FIGS. 2-5. In some embodiments, the configuration and state data may also be provided for display on the platform. For example, the platform may determine the relevant configuration and state data for display to the user to enable the user to more efficiently and intuitive diagnose root causes and issues.

The representation may be implemented in Java, C++, C#, or any suitable programming language, on any computing hardware, such as a general-purpose processor or graphics processor. In some embodiments, the invention may be implemented directly in hardware, via a field-programmable gate array or application-specific integrated circuit.

Figure 16:
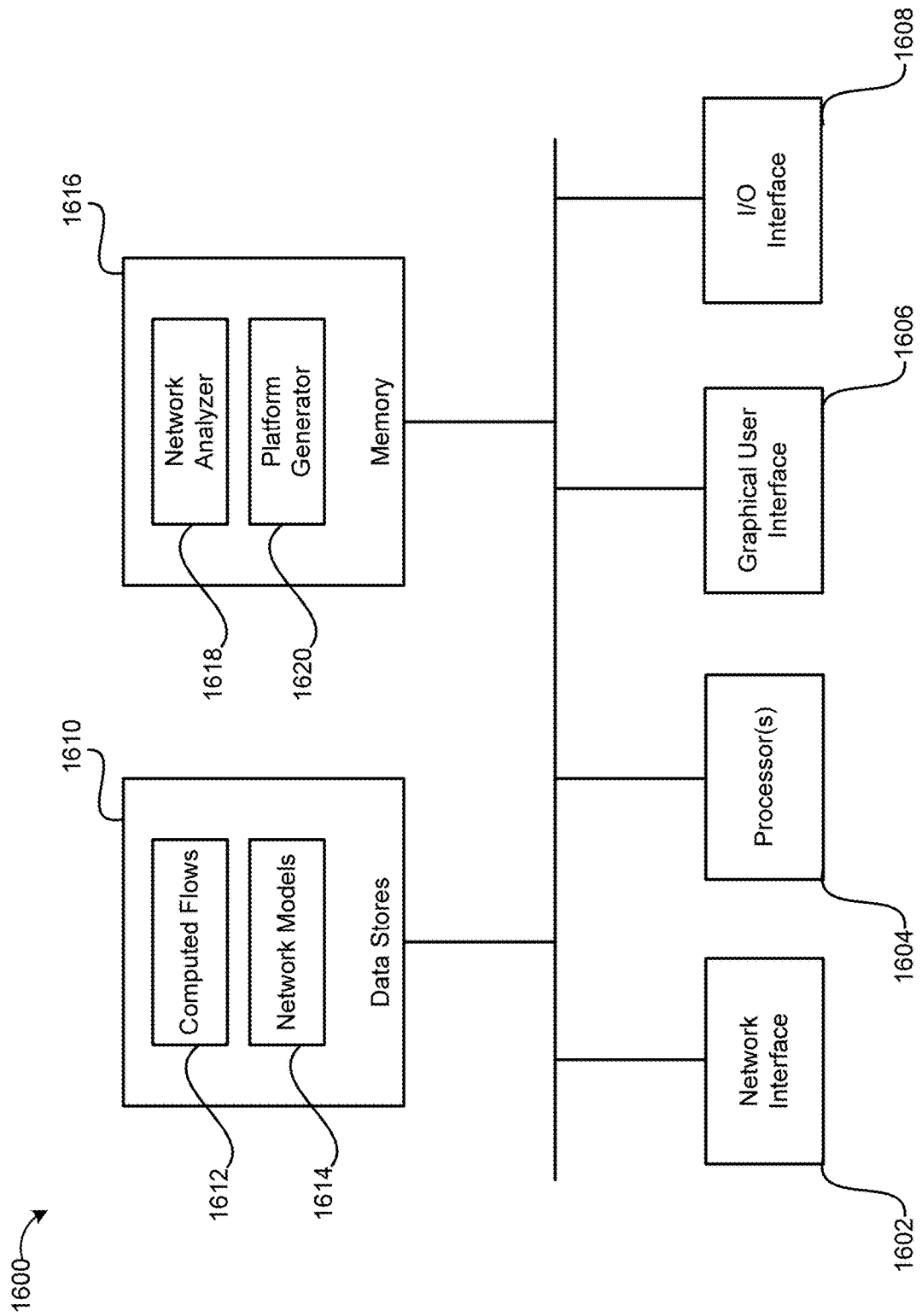
FIG. 16 is a diagram illustrating example components of a network analysis system, in accordance with an embodiment of the present invention.

FIG. 16 is a high-level block diagram 1600 of a computer system, in accordance with an embodiment of the present invention. As shown in FIG. 16, a computer system may include hardware elements connected via a bus, including a network interface 1602, that enables the computer system to connect to other computer systems over a local area network (LAN), wide area network (WAN), mobile network (e.g., EDGE, 3G, 4G, or other mobile network), or other network. The computer system may further include one or more processors 1604, such as a central processing unit (CPU), field programmable gate array (FPGA), application-specific integrated circuit (ASIC), network processor, or other processor. Processors may include single or multi-core processors.

In some embodiments, the computer system may include a graphical user interface (GUI) 1606. GUI 1606 may connect to a display (LED, LCD, tablet, touch screen, or other display) to output user viewable data. In some embodiments, GUI 1606 may be configured to receive instructions (e.g., through a touch screen or other interactive interface). In some embodiments, I/O interface 1608 may be used to connect to one or more input and/or output devices such as mice, keyboards, touch-sensitive input devices, and other input or output devices. I/O interface 1608 may include a wired or wireless interface for connecting to infrared, Bluetooth, or other wireless devices.

In some embodiments, the computer system may include local or remote data stores 1610. Data stores 1610 may include various computer readable storage media, storage systems, and storage services, as are known in the art (e.g., disk drives, CD-ROM, digital versatile disk (DVD) or other optical storage, magnetic cassettes, magnetic tape, magnetic disk storage or other magnetic storage devices, relational databases, object storage systems, local or cloud-based storage services, or any other storage medium, system, or service). Data stores 1610 may include data generated, stored, or otherwise utilized as described herein. For example, data stores 1610 may include computed flows 1612 and network models 1614, generated and stored as described above. Memory 1616 may include various memory technologies, including RAM, ROM, EEPROM, flash memory or other memory technology. Memory 1616 may include executable code to implement methods as described herein. For example, memory 1616 may include a network analyzer module 1618 and report generator module 1620 that each implement methods described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A computer-implemented method for network analysis, comprising:
   obtaining, from one or more computing devices in a network, configuration data and state data associated with the network, wherein the configuration and state data for a given network device of the network describes at least one of how the given network device modifies, forwards, or drops packets within the network, and wherein the configuration and state data includes at least one of a rule, a forwarding state, or an Internet Protocol (IP) table;
   generating, by the one or more computing devices and using the configuration data and the state data, a network model that models behavior of a plurality of network devices of the network, wherein the network model describes processing of data packets, the processing including at least one potential traffic flow through the network;
   providing an interface to a user device, the interface including one or more user selectable elements to allow a user to specify one or more network flows of interest, wherein at least one user selectable element is an input field that enables the user to search a specific header value in the network model by inputting the specific header value into the input field;
   receiving, from the user device, at least one header specified by the user from the input field provided on the interface, the specific header value corresponding to at least one network flow specifier which describes one or more characteristics of one or more traffic flows of interest;
   obtaining, from the network model and in response to receiving the at least one specified header value, a subset of network flow path information associated with the traffic flows of interest of the network, wherein the subset of network flow information is identified determined based on the network flow specifier;

exposing the subset of network flow path information at one or more corresponding functional layers of the network; and providing for display on the user device, the subset of network flow path information and the one or more traffic flows of the network at the one or more corresponding functional layers, including the modeled behavior of the one or more network devices at one or more of the corresponding functional layers.

2. The computer-implemented method of claim 1, further comprising:

determining network flow paths sharing one or more common path elements; identifying the network flow paths sharing one or more common path elements as a group of network flow paths;

inspecting each network flow path in the group individually for differences between each network flow path within the group; and providing for display the differences between each network flow path in the group.

3. The computer-implemented method of claim 1, further comprising:

determining one or more sample packets for each network flow path, wherein the one or more sample packets represents a packet having forwarding behavior along each network flow path; and providing for display the one or more sample packets.

4. The computer-implemented method of claim 1, further comprising:

providing for selection one or more constraints applicable to each network flow path, wherein the one or more constraints limit a scope of the one or more network flow paths;

receiving a selection for the one or more constraints; and providing for display the scope of the one or more network flow paths determined by the selection of the one or more constraints.

5. The computer-implemented method of claim 1, further comprising:

identifying a first request flow path or first response flow path in the network;

generating a second response flow path corresponding to the first request flow path, or a second request flow path corresponding to the first response flow path in the network, wherein traffic matching the first request flow path generates traffic matching the second response flow path, and traffic matching the second request flow path generates traffic matching the first response flow path;

determining the flow data based on one or more of the first request flow path, first response flow path, second request flow path and second response flow path; and providing for display the flow path data.

6. The computer-implemented method of claim 5, further comprising:

analyzing at least one of the request flow path and the response flow path;

determining that the request flow path is a stateful request flow path, wherein the stateful request flow path establishes a state in the network that determines forwarding behavior defined by the response flow path associated with the one or more network devices; and determining that the response flow path is a stateful response flow path, wherein the stateful response flow path includes packets having forwarding behavior matching the request flow path through the network.

7. The computer-implemented method of claim 1, further comprising:

computing one or more first flows in a first snapshot of the network and one or more second flows in a second snapshot of the network that match one or more constraints;

for each first flow in the first snapshot, computing a first sample packet;

analyzing a first behavior of the first sample packet through the first snapshot;

analyzing a second behavior of the first sample packet through the second snapshot;

computing a third collection of flows in the second flows of the second snapshot that are distinct from the flows matching the first sample packet for each first flow in the first snapshot;

for each flow in the third collection of flows, computing a second sample packet;

analyzing a third behavior of the second sample packet through the first snapshot;

analyzing a fourth behavior of the second sample packet through the second snapshot;

comparing the first behavior with the second behavior;

comparing the third behavior with the fourth behavior;

providing for display the comparison between the first behavior and the second behavior; and providing for display the comparison between the third behavior and the fourth behavior.

8. The computer-implemented method of claim 1, further comprising:

providing for selection two or more network configurations of the network;

comparing the two or more network configurations based at least in part on the configuration and state data corresponding to one or more functional layers; and providing for display the two or more network configurations, the display including differences between the two or more network configurations at the one or more corresponding functional layers.

9. A non-transitory computer readable medium storing code executable by a process to perform a method, the method comprising:

obtaining, from network devices on a network, configuration data and state data for the network, wherein the configuration data and state data for a given network device describes at least one of how the given network device modifies, forwards, or drops packets within the network, and wherein the configuration and state data includes at least one of a rule, a forwarding state, or an Internet Protocol (IP) table;

generating, using the configuration data and state data, a network model that models behavior of the one or more network devices of the network, wherein the network model describes processing of data packets, the processing including at least one potential traffic flow through the network;

obtaining, from the network model, network flow path information defining interconnections between one or more network devices on a network;

obtaining, from the network model, traffic data defining behavior of packets traversing across the interconnections between the one or more network devices at one or more corresponding functional layers of the network;

providing an interface to a user device, the interface including one or more user selectable elements to allow a user to specify one or more network flows of interest, wherein at least one user selectable element is an input field that enables the user to search a specific header value in the network model by inputting the specific header value into the input field;

receiving, from the user device, at least one header value specified by the user from the input field, the specific header value corresponding to at least one network flow specifier which describes one or more characteristics of the one or more traffic flows of interest; and providing for display a subset of the network flow path information, a subset of the traffic data, and the modeled behavior of one or more of the network devices at one or more of the functional layers using one or more categories of filters identified based on the at least one network flow specifier, wherein the one or more categories of filters are selectable to modify the display with an updated subset of the network flow path information and an updated subset of the traffic data that satisfies a selection of the one or more categories of filters.

10. The non-transitory computer readable medium of claim 9, wherein the one or more categories of filters includes at least one of: packet header values, input and output interfaces, forwarding behavior, and types of network functions.

11. The non-transitory computer-readable medium of claim 9, the method further comprising:
computing one or more first flows in a first snapshot of the network and one or more second flows in a second snapshot of the network that match one or more constraints;
for each first flow in the first snapshot, computing a first sample packet;
analyzing a first behavior of the first sample packet through the first snapshot;
analyzing a second behavior of the first sample packet through the second snapshot;
computing a third collection of flows in the second flows of the second snapshot that are distinct from the flows matching the first sample packet for each first flow in the first snapshot;
for each flow in the third collection of flows, computing a second sample packet;
analyzing a third behavior of the second sample packet through the first snapshot;
analyzing a fourth behavior of the second sample packet through the second snapshot;
comparing the first behavior with the second behavior;
comparing the third behavior with the fourth behavior;
providing for display the comparison between the first behavior and the second behavior; and
providing for display the comparison between the third behavior and the fourth behavior.

12. The non-transitory computer readable medium of claim 9, the method further comprising:
providing for selection one or more constraints applicable to each network flow path, wherein the one or more constraints limit a scope of the one or more network flow paths;
receiving a selection for the one or more constraints; and
providing for display the scope of the one or more network flow paths determined by the selection of the one or more constraints.

13. The non-transitory computer readable medium of claim 9, wherein the method further comprises:
updating the one or more categories of filters based at least in part on the network flow path data and the traffic data provided for display.

14. The non-transitory computer readable medium of claim 9, wherein the method further comprises:
updating the one or more categories of filters based at least in part on previous selections of the one or more categories of filters.

15. The non-transitory computer readable medium of claim 9, wherein the method further comprises:
aggregating the network flow path data and the traffic data;
computing a plurality of network flow paths defining the interconnections of the one or more network devices on the network;
storing the plurality of network flow paths; and
classifying the plurality of network flow paths.

16. The non-transitory computer readable medium of claim 15, wherein the method further comprises:
analyzing the plurality of network flow paths; and
determining at least two network flow paths sharing a common path that ends in a loop.

17. The non-transitory computer readable medium of claim 15, wherein the method further comprises:
analyzing the plurality of network flow paths; and
determining at least two network flow paths sharing a common path and one or more forwarding rules or configuration.

18. A network analysis system, comprising:
one or more processors; and
one or more memory devices including instructions that, when executed by the one or more processors, cause the network analysis system to:
receive configuration data and state data from one or more network devices on a network, wherein the data includes at least one of forwarding configuration data and forwarding state data, wherein the configuration and state data for a given network device of the network devices describes at least one of how the given network device modifies, forwards, or drops packets within the network, and wherein the configuration and state data includes at least one of a rule, a forwarding state, or an Internet Protocol (IP) table;
generate, using the configuration data and state data, a network model that models behavior of the one or more network devices, wherein the network model describes processing of data packets, the processing including at least one potential traffic flow through the network;
obtain, from the network model, network flow path information defining interconnections between the one or more network devices on the network;
provide an interface to a user device, the interface including one or more user selectable elements to allow a user to specify categories of filters, wherein individual categories of filters describe one or more of the network flow path, the configuration data, and the state data in the network, at least one user selectable element being an input field that enables the user to search the specific header value by inputting a specific header value into the input field;

receive, from the user device, at least one header value specified by the user from the input field, the header value identifying one or more selected categories of filters of the categories of filters, wherein the one or more categories of filters describe one or more of the network flow path, the configuration data, and the state data in the network;

provide for display a subset of the configuration data and a subset of the state data using the one or more categories of filters; and provide for display a subset of the network flow path information using the one or more selected categories of filters, including the modeled behavior of the one or more network devices at a corresponding functional layer.

19. The network analysis system of claim 18, wherein the one or more memory devices further includes instructions that, when executed by the one or more processors, cause the network analysis system to:

compute one or more first flows in a first snapshot of the network and one or more second flows in a second snapshot of the network that match one or more constraints;

for each first flow in the first snapshot, compute a first sample packet;

analyze a first behavior of the first sample packet through the first snapshot;

analyze a second behavior of the first sample packet through the second snapshot;

compute a third collection of flows in the second flows of the second snapshot that are distinct from the flows matching the first sample packet for each first flow in the first snapshot;

for each flow in the third collection of flows, compute a second sample packet;

analyze a third behavior of the second sample packet through the first snapshot;

analyze a fourth behavior of the second sample packet through the second snapshot;

compare the first behavior with the second behavior;

compare the third behavior with the fourth behavior;

provide for display the comparison between the first behavior and the second behavior; and provide for display the comparison between the third behavior and the fourth behavior.

20. The network analysis system of claim 18, wherein the one or more memory devices further includes instructions that, when executed by the one or more processors, cause the network analysis system to:

provide for selection one or more constraints applicable to each network flow path, wherein the one or more constraints limit a scope of the one or more network flow paths;

receive a selection for the one or more constraints; and provide for display the scope of the one or more network flow paths determined by the selection of the one or more constraints.

* * * * *